(12) United States Patent
Zelenev et al.

(10) Patent No.: US 11,407,930 B2
(45) Date of Patent: *Aug. 9, 2022

(54) COMPOSITIONS AND METHODS FOR ENHANCEMENT OF PRODUCTION OF LIQUID AND GASEOUS HYDROCARBONS

(71) Applicant: Flotek Chemistry, LLC, Houston, TX (US)

(72) Inventors: Andrei Zelenev, Spring, TX (US); Lakia M. Champagne, The Woodlands, TX (US); Bill Zhou, The Woodlands, TX (US); Nathan L. Lett, Cypress, TX (US); Keith Ingram Dismuke, Germantown, TN (US); Glenn S. Penny, Dalian (CN)

(73) Assignee: Flotek Chemistry, LLC, Houston, TX (US)

(*) Notice: Subject to any disclaimer, the term of this patent is extended or adjusted under 35 U.S.C. 154(b) by 176 days.

This patent is subject to a terminal disclaimer.

(21) Appl. No.: 16/206,245

(22) Filed: Nov. 30, 2018

(65) Prior Publication Data

US 2019/0100689 A1 Apr. 4, 2019

Related U.S. Application Data

(60) Continuation-in-part of application No. 14/938,399, filed on Nov. 11, 2015, now Pat. No. 10,144,862, which is a division of application No. 13/889,709, filed on May 8, 2013, now Pat. No. 9,200,192.

(60) Provisional application No. 61/644,419, filed on May 8, 2012.

(51) Int. Cl.
  *C09K 8/584* (2006.01)
  *E21B 43/30* (2006.01)
  *C09K 8/60* (2006.01)

(52) U.S. Cl.
  CPC .............. *C09K 8/584* (2013.01); *C09K 8/602* (2013.01); *E21B 43/30* (2013.01)

(58) Field of Classification Search
  CPC .......... C09K 8/584; C09K 8/602; E21B 43/30
  See application file for complete search history.

(56) References Cited

U.S. PATENT DOCUMENTS

| | | |
|---|---|---|
| 3,047,062 A | 7/1962 | Meadors |
| 3,060,210 A | 10/1962 | De Groote |
| 3,347,789 A | 10/1967 | Dickson et al. |
| 3,368,624 A | 2/1968 | Heuer et al. |
| 3,483,923 A | 12/1969 | Darley |
| 3,710,865 A | 1/1973 | Kiel |
| 3,756,319 A | 9/1973 | Holm et al. |
| 3,760,881 A | 9/1973 | Kiel |
| 3,850,248 A | 11/1974 | Carney |
| 3,919,411 A | 11/1975 | Glass et al. |
| 4,005,020 A | 1/1977 | McCormick |
| 4,206,809 A | 6/1980 | Jones |
| 4,233,165 A | 11/1980 | Salathiel et al. |
| 4,276,935 A | 7/1981 | Hessert et al. |
| 4,360,061 A | 11/1982 | Canter et al. |
| 4,414,128 A | 11/1983 | Goffinet |
| 4,472,291 A | 9/1984 | Rosano |
| 4,511,488 A | 4/1985 | Matta |
| 4,650,000 A | 3/1987 | Andreasson et al. |
| 4,844,756 A | 7/1989 | Forsberg |
| 5,008,026 A | 4/1991 | Gardner et al. |
| 5,034,140 A | 7/1991 | Gardner et al. |
| 5,076,954 A | 12/1991 | Loth et al. |
| 5,083,613 A | 1/1992 | Gregoli et al. |
| 5,095,989 A | 3/1992 | Prukop |
| 5,217,531 A | 6/1993 | Cheung |
| 5,247,995 A | 9/1993 | Tjon-Joe-Pin et al. |
| 5,310,002 A | 5/1994 | Blauch et al. |
| 5,356,482 A | 10/1994 | Mehta et al. |
| 5,567,675 A | 10/1996 | Romocki |
| 5,587,354 A | 12/1996 | Duncan, Jr. |
| 5,587,357 A | 12/1996 | Rhinesmith |
| 5,604,195 A | 2/1997 | Misselyn et al. |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,759,409 A | 6/1998 | Knauf |
| 5,762,138 A | 6/1998 | Ford et al. |
| 5,784,386 A | 7/1998 | Norris |
| 5,811,383 A | 9/1998 | Klier et al. |
| 5,830,831 A | 11/1998 | Chan et al. |

(Continued)

FOREIGN PATENT DOCUMENTS

| | | |
|---|---|---|
| CN | 102127414 A | 7/2011 |
| CN | 102277143 B | 12/2011 |

(Continued)

OTHER PUBLICATIONS

PCT/US2014/37334, Oct. 21, 2014, International Search Report and Written Opinion.

(Continued)

*Primary Examiner* — Alicia Bland
(74) *Attorney, Agent, or Firm* — Wolf, Greenfield & Sacks, P.C.

(57) ABSTRACT

A well treatment composition designed for the simultaneous enhancement of the production of both liquid and gaseous hydrocarbons from the same reservoir on a non-selective basis. The well treatment composition includes a first surfactant and a second surfactant, wherein the second surfactant is selected from the group consisting of ethylenediaminealkoxylate, diethylenetriaminealkoxylate, ethoxylated alkylene amines, ethoxylated alkyl amines, propoxylated alkylene amines, propoxylated alkyl amines, ethoxylated-propoxylated alkylene amines and ethoxylated-propoxylated alkyl amines. The well treatment composition also includes a first solvent, a second solvent and water. Methods for using the well treatment composition include the steps of emplacing the well treatment composition into wells having high and low gas-to-oil ratios.

11 Claims, No Drawings

(56) References Cited

U.S. PATENT DOCUMENTS

| | | | |
|---|---|---|---|
| 5,874,386 A | 2/1999 | Chan et al. |
| 5,925,233 A | 7/1999 | Miller et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,225,357 B1* | 5/2001 | Breen .................... C10G 33/04 516/163 |
| 6,228,830 B1 | 5/2001 | Vlasblom |
| 6,260,621 B1 | 7/2001 | Furman et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,581,687 B2 | 6/2003 | Collins et al. |
| 6,593,279 B2 | 7/2003 | Von Krosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,914,040 B2 | 7/2005 | Deak et al. |
| 6,939,832 B2 | 9/2005 | Collins |
| 6,984,610 B2 | 1/2006 | VonKrosigk et al. |
| 7,021,378 B2 | 4/2006 | Prukop |
| 7,122,509 B2 | 10/2006 | Sanner et al. |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,316,273 B2 | 1/2008 | Nguyen |
| 7,380,606 B2* | 6/2008 | Pursley .................. C09K 8/035 166/305.1 |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,107 B2 | 3/2013 | Fan et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,684,079 B2 | 4/2014 | Wattenbarger et al. |
| 8,778,850 B2 | 7/2014 | Andrecola |
| 8,865,632 B1 | 10/2014 | Parnell et al. |
| 9,068,108 B2 | 6/2015 | Hill et al. |
| 9,200,192 B2 | 12/2015 | Zelenev et al. |
| 9,222,013 B1 | 12/2015 | Champagne et al. |
| 9,321,955 B2 | 4/2016 | Hill et al. |
| 9,428,683 B2 | 8/2016 | Hill et al. |
| 9,464,223 B2 | 10/2016 | Champagne et al. |
| 9,505,970 B2 | 11/2016 | Vaughn et al. |
| 9,790,414 B2 | 10/2017 | Champagne et al. |
| 9,809,741 B2 | 11/2017 | Hill et al. |
| 9,850,418 B2 | 12/2017 | Champagne et al. |
| 9,868,893 B2 | 1/2018 | Saboowala et al. |
| 9,884,988 B2 | 2/2018 | Dismuke et al. |
| 9,890,624 B2 | 2/2018 | Portwood |
| 9,890,625 B2 | 2/2018 | Portwood et al. |
| 9,951,264 B2 | 4/2018 | Penny et al. |
| 9,957,779 B2 | 5/2018 | Fursdon-Welsh et al. |
| 9,994,762 B2 | 6/2018 | Hill et al. |
| 10,000,693 B2 | 6/2018 | Hill et al. |
| 10,005,948 B2 | 6/2018 | Champagne et al. |
| 10,053,619 B2 | 8/2018 | Saboowala et al. |
| 10,081,760 B2 | 9/2018 | Ngantung et al. |
| 10,087,361 B2 | 10/2018 | Hill et al. |
| 10,144,862 B2* | 12/2018 | Zelenev .................. E21B 43/30 |
| 10,196,557 B2 | 2/2019 | Hill et al. |
| 10,280,360 B2 | 5/2019 | Champagne et al. |
| 10,287,483 B2 | 5/2019 | Saboowala et al. |
| 10,294,757 B2 | 5/2019 | Fursdon-Welsh et al. |

(56) References Cited

U.S. PATENT DOCUMENTS

| | | | |
|---|---|---|---|
| 10,294,764 B2 | 5/2019 | Champagne et al. | |
| 10,308,859 B2 | 6/2019 | Champagne et al. | |
| 10,421,707 B2 | 9/2019 | Trabelsi et al. | |
| 10,544,355 B2 | 1/2020 | Hill et al. | |
| 10,577,531 B2 | 3/2020 | Pursley et al. | |
| 10,590,332 B2 | 3/2020 | Penny et al. | |
| 11,254,856 B2 | 2/2022 | Hill et al. | |
| 2001/0007663 A1 | 7/2001 | Von Corswant | |
| 2003/0022944 A1 | 1/2003 | Gumkowski et al. | |
| 2003/0069143 A1 | 4/2003 | Collins | |
| 2003/0232095 A1 | 12/2003 | Garti et al. | |
| 2006/0014648 A1 | 1/2006 | Milson et al. | |
| 2006/0211593 A1 | 9/2006 | Smith et al. | |
| 2006/0258541 A1 | 11/2006 | Crews | |
| 2007/0123445 A1 | 5/2007 | Tuzi et al. | |
| 2007/0293404 A1 | 12/2007 | Hutchins et al. | |
| 2007/0295368 A1 | 12/2007 | Harrison et al. | |
| 2008/0274918 A1 | 11/2008 | Quintero et al. | |
| 2008/0287324 A1 | 11/2008 | Pursley et al. | |
| 2009/0078415 A1 | 3/2009 | Fan et al. | |
| 2009/0137432 A1 | 5/2009 | Sullivan et al. | |
| 2009/0159288 A1 | 6/2009 | Horvath Szabo et al. | |
| 2009/0221456 A1 | 9/2009 | Harrison et al. | |
| 2009/0260819 A1 | 10/2009 | Kurian et al. | |
| 2009/0275488 A1 | 11/2009 | Zamora et al. | |
| 2009/0281004 A1 | 11/2009 | Ali et al. | |
| 2010/0022421 A1 | 1/2010 | Gutierrez et al. | |
| 2010/0173805 A1 | 7/2010 | Pomerleau | |
| 2010/0216670 A1 | 8/2010 | Del Gaudio et al. | |
| 2010/0243248 A1 | 9/2010 | Golomb et al. | |
| 2010/0252267 A1 | 10/2010 | Harris et al. | |
| 2010/0263863 A1 | 10/2010 | Quintero et al. | |
| 2010/0272765 A1 | 10/2010 | Ho O et al. | |
| 2010/0307757 A1 | 12/2010 | Blow et al. | |
| 2011/0021386 A1 | 1/2011 | Ali et al. | |
| 2011/0136706 A1 | 6/2011 | Carroll et al. | |
| 2011/0146983 A1 | 6/2011 | Sawdon | |
| 2011/0190174 A1 | 8/2011 | Weerasooriya et al. | |
| 2011/0220353 A1 | 9/2011 | Bittner et al. | |
| 2011/0237467 A1 | 9/2011 | Cornette et al. | |
| 2011/0253365 A1 | 10/2011 | Crews et al. | |
| 2011/0290491 A1 | 12/2011 | Gupta et al. | |
| 2012/0004146 A1* | 1/2012 | Van Zanten | C09K 8/36 507/103 |
| 2012/0015852 A1 | 1/2012 | Quintero et al. | |
| 2012/0071366 A1 | 3/2012 | Falana et al. | |
| 2012/0080232 A1 | 4/2012 | Muller et al. | |
| 2012/0129738 A1 | 5/2012 | Gupta et al. | |
| 2012/0149626 A1 | 6/2012 | Fluck et al. | |
| 2012/0168165 A1 | 7/2012 | Holcomb et al. | |
| 2012/0181019 A1 | 7/2012 | Saini et al. | |
| 2012/0193095 A1 | 8/2012 | Varadaraj et al. | |
| 2012/0208726 A1 | 8/2012 | Smith et al. | |
| 2012/0234548 A1 | 9/2012 | Dyer | |
| 2012/0241155 A1 | 9/2012 | Ali et al. | |
| 2012/0241220 A1 | 9/2012 | Quintero et al. | |
| 2012/0255887 A1 | 10/2012 | Holms et al. | |
| 2012/0261120 A1 | 10/2012 | Del Gaudio et al. | |
| 2012/0285690 A1 | 11/2012 | Weaver et al. | |
| 2012/0285694 A1 | 11/2012 | Morvan et al. | |
| 2012/0318504 A1 | 12/2012 | Fan et al. | |
| 2012/0318515 A1 | 12/2012 | Cawiezel et al. | |
| 2012/0322697 A1 | 12/2012 | Zhang | |
| 2012/0325492 A1 | 12/2012 | Fefer et al. | |
| 2013/0029883 A1 | 1/2013 | Dismuke et al. | |
| 2013/0048281 A1 | 2/2013 | Van Zanten et al. | |
| 2013/0079255 A1 | 3/2013 | Del Gaudio et al. | |
| 2013/0109597 A1 | 5/2013 | Sarkar et al. | |
| 2013/0133886 A1 | 5/2013 | Quintero | |
| 2013/0137611 A1 | 5/2013 | Pierce et al. | |
| 2013/0146288 A1 | 6/2013 | Smith et al. | |
| 2013/0146545 A1 | 6/2013 | Pabalan et al. | |
| 2013/0153232 A1 | 6/2013 | Bobier et al. | |
| 2013/0153234 A1 | 6/2013 | Bobier et al. | |
| 2013/0192826 A1 | 8/2013 | Kurian et al. | |
| 2013/0233559 A1 | 9/2013 | van Zanten et al. | |
| 2013/0244913 A1 | 9/2013 | Maberry et al. | |
| 2013/0261033 A1 | 10/2013 | Nguyen | |
| 2013/0292121 A1 | 11/2013 | Penny et al. | |
| 2014/0005079 A1 | 1/2014 | Dahanayake et al. | |
| 2014/0110344 A1 | 4/2014 | Hoag et al. | |
| 2014/0202700 A1 | 7/2014 | Blair | |
| 2014/0262274 A1 | 9/2014 | Dismuke et al. | |
| 2014/0262288 A1 | 9/2014 | Penny et al. | |
| 2014/0284053 A1 | 9/2014 | Germack | |
| 2014/0284057 A1 | 9/2014 | Champagne et al. | |
| 2014/0332212 A1 | 11/2014 | Ayers et al. | |
| 2014/0367107 A1 | 12/2014 | Hill et al. | |
| 2015/0105302 A1 | 4/2015 | Pursley et al. | |
| 2015/0197683 A1 | 7/2015 | Hategan et al. | |
| 2015/0247082 A1 | 9/2015 | Rea | |
| 2015/0247381 A1 | 9/2015 | Pursley et al. | |
| 2015/0329767 A1 | 11/2015 | Vaughn et al. | |
| 2016/0003018 A1 | 1/2016 | Saboowala et al. | |
| 2016/0017204 A1 | 1/2016 | Hill et al. | |
| 2016/0024891 A1 | 1/2016 | Fursdon-Welsh et al. | |
| 2016/0032172 A1 | 2/2016 | Pursley et al. | |
| 2016/0096989 A1 | 4/2016 | Ngantung et al. | |
| 2016/0257911 A1 | 9/2016 | Denison et al. | |
| 2016/0312106 A1 | 10/2016 | Penny et al. | |
| 2017/0275518 A1 | 9/2017 | Trabelsi et al. | |
| 2017/0313925 A1 | 11/2017 | Dismuke et al. | |
| 2017/0335179 A1 | 11/2017 | Ngantung et al. | |
| 2017/0368560 A1 | 12/2017 | McElhany et al. | |
| 2018/0134941 A1 | 5/2018 | Saboowala et al. | |
| 2018/0171213 A1 | 6/2018 | Hill et al. | |
| 2018/0282611 A1 | 10/2018 | Hill et al. | |
| 2019/0031948 A1 | 1/2019 | Hill et al. | |
| 2019/0055457 A1 | 2/2019 | Smith, Jr. et al. | |
| 2019/0055458 A1 | 2/2019 | Smith, Jr. et al. | |
| 2019/0055459 A1 | 2/2019 | Zelenev et al. | |
| 2019/0085236 A1 | 3/2019 | Saboowala et al. | |
| 2019/0090476 A1 | 3/2019 | Smith, Jr. et al. | |
| 2019/0169488 A1 | 6/2019 | Hill et al. | |
| 2019/0169492 A1 | 6/2019 | Hill et al. | |
| 2019/0241796 A1 | 8/2019 | Mast et al. | |
| 2019/0264094 A1 | 8/2019 | Hill et al. | |
| 2019/0284467 A1 | 9/2019 | Forbes et al. | |
| 2019/0315674 A1 | 10/2019 | Trabelsi et al. | |
| 2019/0316021 A1 | 10/2019 | Champagne et al. | |

FOREIGN PATENT DOCUMENTS

| | | |
|---|---|---|
| CN | 103614128 A | 3/2014 |
| CN | 103642477 A | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| WO | WO 1999/049182 A1 | 9/1999 |
| WO | WO 2005/048706 A2 | 6/2005 |
| WO | WO 2007/011475 A1 | 1/2007 |
| WO | WO 2012/158645 A1 | 11/2012 |
| WO | WO 2017/099709 A1 | 6/2017 |
| WO | WO 2018/111229 A1 | 6/2018 |

OTHER PUBLICATIONS

International Search Report and Written Opinion dated Oct. 21, 2014 for Application No. PCT/US2014/37334.

[No Author Listed], The HLB system: a time-saving guide to emulsifier selection. ICI Americas Inc. 1976. 22 pages.

ADM, Evolution Chemicals E5789-117 Description. Jun. 2014. 1 page.

Brost et al., Surfactants assist water-in-oil monitoring by fluroescence. World Oil. Oct. 2008;229(10):12 pages.

Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.

(56) References Cited

OTHER PUBLICATIONS

Crafton et al., Micro-emulsion effectiveness for twenty four wells, Eastern Green River, Wyoming. 2009 SPE Rocky Mountain Petroleum Technology Conference. Denver, Colorado, USA, Apr. 14-16, 2009. SPE-123280. 13 pages.

Haw, The HLB system: a time saving guide to surfactant selection. Presentation to the Midwest chapter of the society of cosmetic chemists. Uniqema. Mar. 9, 2004. 39 slides.

Howard et al., Comparison of flowback aids: understanding their capillary pressure and wetting properties. SPE Production & Operations. Aug. 2010;:376-87.

Kunieda et al. Evaluation of hydrophile-lipophile balance (HLB) of nonionic surfactants. J Colloid and Interface Sci. Sep. 1985;107(1):107-21.

Penny et al., Enhanced Load Water-Recovery Technique Improves Stimulation Results. Society of Petroleum Engineers of AIME. SPE 12149. Jan. 1, 1983. 12 pages.

Tang et al., Relative Permeability Modification in Gas/Liquid Systems Through Wettability Alteration to Intermediate Gas Wetting. SPE Reservoir Evaluation & Engineering. Dec. 2002:427-36.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

\* cited by examiner

COMPOSITIONS AND METHODS FOR ENHANCEMENT OF PRODUCTION OF LIQUID AND GASEOUS HYDROCARBONS

RELATED APPLICATIONS

This application is a continuation-in part of and claims the benefit of U.S. patent application Ser. No. 14/938,399, filed on Nov. 11, 2015 (now U.S. Pat. No. 10,144,862, granted on Dec. 4, 2018), which is a divisional of and claims the benefit of U.S. patent application Ser. No. 13/889,709 filed on May 8, 2013 (now U.S. Pat. No. 9,200,192, granted on Dec. 1, 2015), which claims the benefit of U.S. Provisional Patent Application Ser. No. 61/644,419, filed on May 8, 2012, the disclosures of which are herein incorporated by reference.

FIELD OF THE INVENTION

The present invention generally relates to the production of petroleum and more particularly to compositions and processes for improving the recovery of liquid and gaseous forms of petroleum from a subterranean geological formation.

BACKGROUND OF THE INVENTION

For many years, petroleum has been recovered from subterranean reservoirs through the use of drilled wells and production equipment. Petroleum hydrocarbons may be produced in a variety of forms, including liquid crude oil, natural gas and light condensates. To enhance the recovery of petroleum, a number of technologies have been developed. Common well stimulation techniques include hydraulic fracturing, water flooding and acidizing operations. Although liquid and gaseous products are typically encountered together, it may be economically desirable to enhance the production of one form of hydrocarbons over another. For example, economic factors may encourage the shift from a predominantly gas-focused production to a production that favors liquid crude oil. Because crude oil and natural gas have very different physical properties, and thus move differently through the porous media of the subterranean formation, the chemicals used for stimulating the well for the purpose of enhancing gas production may not work as effectively in enhancing oil production. As a result, prior art well stimulation and enhancement products have been formulated to recover a particular form of hydrocarbon, i.e., natural gas or liquid crude oil.

To permit the production of multiple forms of hydrocarbons from a given reservoir, well operators are required to use and stock multiple chemicals for treating the same well. Such practice also often requires additional equipment for handling multiple types of chemicals. The use of multiple treatment chemicals increases the cost and complexity of operating the well. Therefore, having a single stimulation product that enhances fluid recovery of multiple forms of hydrocarbons is desirable. It is to these and other objects that the present invention is directed.

SUMMARY OF THE INVENTION

In a preferred embodiment, the present invention includes a well treatment composition that is suitable for the simultaneous enhancement of the production of both liquid and gaseous hydrocarbons from the same reservoir on a non-selective basis. In a specific embodiment, the method provides for increasing the production of oil from a first well having a high gas-to-oil ratio and the production of gas from a second well having a low gas-to-oil ratio. The method preferably includes the steps of providing a complex nanofluid (also may be referred to as a microemulsion) additive, emplacing the complex nanofluid additive into the first well and emplacing the same complex nanofluid additive into the second well.

In another aspect, the novel well treatment composition includes a first surfactant and a second surfactant, wherein the second surfactant is selected from the group consisting of ethoxylated alkylene amines, ethoxylated alkyl amines, propoxylated alkylene amines, propoxylated alkyl amines, ethoxylated-propoxylated alkylene amines and ethoxylated-propoxylated alkyl amines. The well treatment composition also includes a first solvent, a second solvent and water. The first solvent is preferably suspended or solubilized as an internal phase with an external phase created by the water by the first and second surfactants.

DETAILED DESCRIPTION OF PREFERRED EMBODIMENTS

In a preferred embodiment, the present invention includes a well treatment composition that is suitable for the simultaneous enhancement of the production of both liquid and gaseous hydrocarbons from the same reservoir on a non-selective basis. In this way, formulations of the preferred embodiments can be used to improve the recovery of liquid and gaseous hydrocarbons during a single treatment operation. The compositions of the preferred embodiments can be used to treat predominantly oil-producing wells to achieve production of gas at commercially viable rates, and to treat predominantly gas-producing wells to achieve production of oil at commercially viable rates.

In preferred embodiments, the microemulsion additives of the present invention include: (i) a first surfactant; (ii) a second surfactant, where the second surfactant includes at least one ethoxylated/propoxylated alkylene or alkyl amine surfactant; (iii) one or more solvents with limited solubility in water; (iv) one or more co-solvents; and (v) water. The inventive well treatment additive is characterized as a microemulsion that includes at least two normally immiscible solvents stabilized by one or more selected surfactants. In a preferred embodiment, the microemulsion includes an internal phase hydrocarbon-based organic solvent distributed in an aqueous external phase.

Surfactants

The term surfactant is given its ordinary meaning in the art and generally refers to compounds having an amphiphilic structure which gives them a specific affinity for oil/water-type and water/oil-type interfaces. In some embodiments, the affinity helps the surfactants to reduce the free energy of these interfaces and to stabilize the dispersed phase of an emulsion or microemulsion.

The term surfactant includes but is not limited to nonionic surfactants, anionic surfactants, cationic surfactants, amphoteric surfactants, zwitterionic surfactants, switchable surfactants, cleavable surfactants, dimeric or gemini surfactants, glucamide surfactants, alkylpolyglycoside surfactants, extended surfactants containing a nonionic spacer arm central extension and an ionic or nonionic polar group, and combinations thereof. Nonionic surfactants generally do not contain any charges. Anionic surfactants generally possess a net negative charge. Cationic surfactants generally possess a net positive charge. Amphoteric surfactants generally have both positive and negative charges, however, the net charge of the surfactant can be positive, negative, or neutral, depending on the pH of the solution. Zwitterionic surfactants are generally not pH dependent. A zwitterion is a neutral molecule with a positive and a negative electrical charge, though multiple positive and negative charges can be present.

Extended surfactants are defined herein to be surfactants having propoxylated/ethoxylated spacer arms. The extended chain surfactants are intramolecular mixtures having at least one hydrophilic portion and at least one lipophilic portion with an intermediate polarity portion in between the hydrophilic portion and the lipophilic portion; the intermediate polarity portion may be referred to as a spacer. They attain high solubilization in the single phase emulsion or microemulsion, and are in some instances, insensitive to temperature and are useful for a wide variety of oil types, such as natural or synthetic polar oil types in a non-limiting embodiment. More information related to extended chain surfactants may be found in U.S. Pat. No. 8,235,120, granted on Aug. 7, 2012, which is incorporated herein by reference in its entirety.

The term co-surfactant as used herein is given its ordinary meaning in the art and refers to compounds (e.g., pentanol) that act in conjunction with surfactants to form an emulsion or microemulsion.

In some embodiments, the surfactants described herein are set forth in U.S. patent application Ser. No. 14/212,731, filed Mar. 14, 2014, titled "METHODS AND COMPOSITIONS FOR USE IN OIL AND/OR GAS WELLS," published as US/2014/0284053 on Sep. 25, 2014, herein incorporated by reference. In some embodiments, the surfactant is described in U.S. patent application Ser. No. 14/212,763, filed Mar. 14, 2014, titled "METHODS AND COMPOSITIONS FOR USE IN OIL AND/OR GAS WELLS," now published as US/2014/0338911 on Nov. 20, 2014, and granted on Feb. 6, 2018 as U.S. Pat. No. 9,884,988, herein incorporated by reference.

In some embodiments, the emulsion or microemulsion comprises from about 1 wt % to about 50 wt %, or from about 1 wt % to about 40 wt %, or from about 1 wt % to about 35 wt %, or from about 5 wt % to about 40 wt %, or from about 5 wt % to about 35 wt %, or from about 10 wt % to about 30 wt %, or from about 10 wt % to about 20 wt % of the surfactant versus the total weight of the emulsion or microemulsion.

In some embodiments, the surfactants described herein are used in conjunction with solvents, and generally may form emulsions or microemulsions that may be diluted to a use concentration to form an oil-in-water nanodroplet dispersion. In some embodiments, the surfactants generally have hydrophile-lipophile balance (HLB) values from about 8 to about 18 or from about 8 to about 14.

Suitable surfactants for use with the compositions and methods are generally described herein. In some embodiments, the surfactant comprises a hydrophilic hydrocarbon surfactant (e.g., a surfactant with an HLB value from about 8 to about 18.

Preferred conventional surfactants, include mixtures of ethoxylated vegetable oils and ethoxylated alcohols. In a more particularly preferred embodiment, the selected surfactant or surfactant mixture (e.g. the first surfactant) has a hydrophile-lipophile balance (HLB) value of between about 8 and about 18. In a particularly preferred embodiment, the surfactant component (e.g. the first surfactant) is an ethoxylated alcohol. In a more preferred embodiment, the surfactant component is an ethoxylated $C_8$-$C_{18}$ alcohol. In a still more preferred embodiment, the surfactant component is an ethoxylated $C_8$-$C_{18}$ alcohol with 5-20 moles of ethylene oxide (EO). In a particularly preferred embodiment, the surfactant component (e.g. the first surfactant) is an ethoxylated vegetable oil. U.S. Pat. No. 7,380,606 issued to Pursley, et. al on Jun. 3, 2008 titled "Composition and Process for Well Cleaning," which is incorporated herein by reference, discloses several surfactants that function as the surfactant component of the microemulsion additive. In certain applications, it may be desirable for the surfactant component to include a mixture of different surfactants and surfactant packages. A particularly preferred surfactant package includes $C_8$-$C_{18}$ linear alcohol alkoxylates, midrange primary, secondary and tertiary alcohols with between 1 and 10 carbon atoms, $C_2$-$C_{10}$ glycols, and can also include between 5-30 wt % water.

In some embodiments, the emulsion or microemulsion may comprise a first surfactant. In some embodiments, the emulsion or microemulsion may comprise a first surfactant and a second surfactant.

In some embodiments, the first surfactant may be selected from the group consisting of ethoxylated fatty acids, ethoxylated fatty amines, and ethoxylated fatty amides wherein the fatty portion is a branched or linear, saturated or unsaturated aliphatic hydrocarbon moiety having from 6 to 18 carbon atoms. In some embodiments, the first surfactant may comprise an ethoxylated vegetable oil.

In some embodiments, the first surfactant includes an alkanolamide surfactant. In some embodiments, the first surfactant includes an alkanolamide surfactant that is a ($C_6$-$C_{18}$) aliphatic amide having groups $R^1$ and $R^2$ substituted on the amide nitrogen, wherein $R^1$ and $R^2$ are each independently selected from the group consisting of —H, —($C_1$-$C_{18}$) aliphatic hydrocarbon, —$(C_2H_4O)_nH$, —$(C_3H_6O)_nH$, —$(C_2H_4O)_n(C_3H_6O)_mH$, and ($C_1$-$C_{18}$) aliphatic alcohol, and n is about 1 to about 50 and m is 0 to about 20, wherein at least one of $R^1$ and $R^2$ is —$(C_2H_4O)_nH$, —$(C_3H_6O)_nH$, —$(C_2H_4O)_n(C_3H_6O)_mH$, or ($C_1$-$C_{18}$) aliphatic alcohol, and n is about 1 to about 50 and m is 0 to about 20.

In some embodiments, the first surfactant includes N,N-bis(hydroxyethyl)coco amides, N,N-bis(hydroxyethyl)coco fatty acid amides, cocamide DEA, cocamide diethanolamine, coco diethanolamides, coco diethanolamine, coco fatty acid diethanolamides, coconut DEA, coconut diethanolamides, coconut oil diethanolamides, coconut oil diethanolamine, lauric diethanolamide, or lauramide DEA. In some embodiments the first surfactant includes an alkoxylated cocamide DEA, an alkoxyated lauramide DEA, an ethoxylated cocamide DEA, or an ethoxylated lauramide DEA.

The alkanolamide surfactant can have the structure:

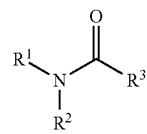

wherein $R^3$ is a $C_6$-$C_{18}$ aliphatic hydrocarbon group, and wherein $R^1$ and $R^2$ are each independently selected from the group consisting of —H, —($C_1$-$C_{18}$) aliphatic hydrocarbon, —$(C_2H_4O)_nH$, —$(C_3H_6O)_nH$, —$(C_2H_4O)_n(C_3H_6O)_mH$, and n is about 1 to about 50 and m is 0 to about 20, wherein at least one of $R^1$ and $R^2$ is —$(C_2H_4O)_nH$, —$(C_3H_6O)_nH$, —$(C_2H_4O)n(C_3H_6O)_mH$, or ($C_1$-$C_{18}$) aliphatic alcohol, and n is about 1 to about 50 and m is 0 to about 20.

In some embodiments, the first surfactant is an aliphatic polyglycoside having the following formula:

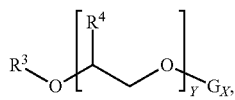

wherein $R^3$ is an aliphatic group having from 6 to 18 carbon atoms; each $R^4$ is independently selected from H, —$CH_3$, or —$CH_2CH_3$; Y is an average number of from about 0 to about 5; and X is an average degree of polymerization (DP) of from about 1 to about 4; G is the residue of a reducing saccharide, for example, a glucose residue. In some embodiments, Y is zero.

In some embodiments, the first surfactant is an aliphatic glycamide having the following formula:

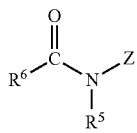

wherein $R^6$ is an aliphatic group having from 6 to 18 carbon atoms; $R^5$ is an alkyl group having from 1 to 6 carbon atoms; and Z is —$CH_2(CH_2OH)_bCH_2OH$, wherein b is from 3 to 5. In some embodiments, $R^5$ is —$CH_3$. In some embodiments, $R^6$ is an alkyl group having from 6 to 18 carbon atoms. In some embodiments, b is 3. In some embodiments, b is 4. In some embodiments, b is 5.

In some embodiments, the first surfactant may include an anionic surfactant. Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, dialkyl sulphosuccinates alkyl ether sulfates, linear and branched ether sulfates, fatty carboxylates, alkyl sarcosinates, alkyl phosphates and combinations thereof.

In some embodiments, the first surfactant is an aliphatic sulfate wherein the aliphatic moiety is a branched or linear, saturated or unsaturated aliphatic hydrocarbon moiety having from 6 to 18 carbon atoms. In some embodiments, the first surfactant is an aliphatic sulfonate wherein the aliphatic moiety is a branched or linear, saturated or unsaturated aliphatic hydrocarbon moiety having from 6 to 18 carbon atoms.

In some embodiments, the first surfactant is an aliphatic alkoxy sulfate wherein the aliphatic moiety is a branched or linear, saturated or unsaturated aliphatic hydrocarbon moiety having from 6 to 18 carbon atoms and from 4 to 40 total ethylene oxide (EO) and propylene oxide (PO) units.

In some embodiments, the first surfactant is an aliphatic-aromatic sulfate wherein the aliphatic moiety is a branched or linear, saturated or unsaturated aliphatic hydrocarbon moiety having from 6 to 18 carbon atoms. In some embodiments, the first surfactant is an aliphatic-aromatic sulfonate wherein the aliphatic moiety is a branched or linear, saturated or unsaturated aliphatic hydrocarbon moiety having from 6 to 18 carbon atoms.

In some embodiments, the first surfactant is an ester or half ester of sulfosuccinic acid with monohydric alcohols.

In some embodiments, the first surfactant is a quaternary alkylammonium salt or a quaternary alkylbenzylammonium salt, whose alkyl groups have 1 to 24 carbon atoms (e.g., a halide, sulfate, phosphate, acetate, or hydroxide salt). In some embodiments, the first surfactant is a quaternary alkylbenzylammonium salt, whose alkyl groups have 1-24 carbon atoms (e.g., a halide, sulfate, phosphate, acetate, or hydroxide salt). In some embodiments, the first surfactant is an alkylpyridinium, an alkylimidazolinium, or an alkyloxazolinium salt whose alkyl chain has up to 18 carbons atoms (e.g., a halide, sulfate, phosphate, acetate, or hydroxide salt).

In some embodiments, the first surfactant is a cationic surfactant such as, monoalkyl quaternary amines, such as cocotrimethylammonium chloride, cetyltrimethylammonium chloride, stearyltrimethylannnonium chloride, soyatrimethylannnonium chloride, behentrimethylammonium chloride, and the like and mixtures thereof. Other suitable cationic surfactants that may be useful include, but are not necessarily limited to, dialkylquaternary amines such as dicetyldimethylammonium chloride, dicocodimethylannnonium chloride, distearyldimethylammonium chloride, and the like and mixtures thereof.

In some embodiments, the first surfactant is an amine oxide (e.g., dodecyldimethylamine oxide, lauramine oxide, laurylamidopropylamine oxide, or cocamidopropylamine oxide). In some embodiments, the first surfactant is amphoteric or zwitterionic, including sultaines (e.g., cocamidopropyl hydroxysultaine, lauryl sultaine, lauryl sulfobetaine, coco sultaine, coco sulfobetaine), betaines (e.g., cocamidopropyl betaine, lauramidopropyl betaine, lauryl betaine, coco betaine), or phosphates (e.g., lecithin).

Non-limiting examples of suitable first surfactants include nonionic surfactants with linear or branched structure, including, but not limited to, alkoxylated alcohols, alkoxylated fatty alcohols, alkoxylated castor oils, alkoxylated fatty acids, and alkoxylated fatty amides with a hydrocarbon chain of at least 8 carbon atoms and 5 units or more of alkoxylation. The term alkoxylation includes ethoxylation and propoxylation.

Other nonionic surfactants include alkyl glycosides and alkyl glucamides. Additional surfactants are described herein. Other non-limiting examples of surfactants include adsorption modifiers, foamers, surface tension lowering enhancers, and emulsion breaking additives. Specific examples of such surfactants include cationic surfactants with a medium chain length, linear or branched anionic surfactants, alkyl benzene anionic surfactants, amine oxides, amphoteric surfactants, silicone based surfactants, alkoxylated novolac resins (e.g. alkoxylated phenolic resins), alkoxylated polyimines, alkoxylated polyamines, and fluorosurfactants. In some embodiments, the surfactant is a nonionic surfactant. In certain embodiments, the nonionic surfactant may be one or more of an ethoxylated castor oil, an ethoxylated alcohol, an ethoxylated tristyrylphenol, or an ethoxylated sorbitan ester, or combinations thereof.

In some embodiments, the second surfactant component is preferably an amine-based surfactant selected from the group consisting of ethylenediaminealkoxylate, diethylenetriaminealkoxylate, ethoxylated alkylene amines, ethoxylated alkyl amines, propoxylated alkylene amines, propoxylated alkyl amines, ethoxylated-propoxylated alkylene amines and ethoxylated-propoxylated alkyl amines. The ethoxylated/propoxylated alkylene or alkyl amine surfactant component preferably includes more than one nitrogen atom per molecule. Suitable amines include ethylenediaminealkoxylate and diethylenetriaminealkoxylate.

Solvents

In some embodiments, the emulsion or microemulsion may comprise a first solvent. In some embodiments, the emulsion or microemulsion may comprise a first solvent and a second solvent. In some embodiments, the solvent may comprise different types of solvents. For example, the solvent may comprise a solvent blend. Such blend comprises a single long chain hydrocarbon solvent or a plurality of types of long chain hydrocarbon solvents. As another non-limiting example, the solvent blend may include a single oxygenated solvent or a plurality of types of oxygenated solvents. In some embodiments, a solvent is a liquid that dissolves other substances, for example, residues or other substances found at or in a wellbore (e.g. kerogens, asphaltenes, paraffins, organic scale).

In some embodiments, the solvent is a long chain hydrocarbon solvent or comprises a plurality of types of long chain hydrocarbon solvents. The term hydrocarbon solvent encompasses unsubstituted cyclic or acyclic, branched or unbranched, saturated or unsaturated, hydrocarbon compounds (e.g., alkanes, alkenes) The term long chain encompasses solvent having a high number of carbon atoms, for example, 12-22, or 12-20, or 12-18, or 14-24, or 14-22, or 14-20, or 13-23, or 11-14, carbon atoms, inclusive.

In some embodiments, the solvent is or comprises a mixture of $C_{12}$-$C_{22}$ hydrocarbon solvents, or a mixture of $C_{12}$-$C_{20}$ hydrocarbon solvents, or a mixture of $C_{12}$-$C_{18}$ hydrocarbon solvents, or a mixture of $C_{14}$-$C_{24}$ hydrocarbon solvents, or a mixture of $C_{14}$-$C_{22}$ hydrocarbon solvents, or a mixture of $C_{14}$-$C_{20}$ hydrocarbon solvents, or a mixture of $C_{13}$-$C_{23}$ hydrocarbon solvents, or a mixture of $C_{11}$-$C_{14}$ hydrocarbon solvents. In some embodiments, the hydrocarbon solvents are unsubstituted cyclic or acyclic, branched or unbranched alkanes. In some embodiments, the hydrocarbon solvents are unsubstituted cyclic or acyclic, branched or unbranched alkenes. In some embodiments, the hydrocarbon solvents include a combination of unsubstituted cyclic or acyclic, branched or unbranched alkanes and unsubstituted cyclic or acyclic, branched or unbranched alkenes.

In some embodiments, the solvent is an aliphatic mineral spirit, which is given its ordinary meaning in the art and refers to a solvent comprising a plurality of types of long chain hydrocarbon solvents, generally alkanes. The aliphatic mineral spirit may be purchased from a commercial source. Non-limiting examples of aliphatic mineral spirits that may be purchased include EFC Crystal 210 solvent (available from Total), Shellsol D80 (available from Shell®), and Exxsol™ D80 (available from Exxon Mobil®). In some embodiments, the aliphatic mineral spirit has a high boiling point (e.g., greater than about 150° C., or greater than about 180° C., or greater than about 200° C.) and/or a low vapor pressure (e.g., less than about 1 kPa). As will be known to those of ordinary skill in the art, aliphatic mineral spirits may comprise a small amount of impurities (e.g., aromatic compounds) due to the manner in which they are prepared (e.g., hydrogenation of petroleum fractions). In some embodiments, the aliphatic mineral spirit comprises less than about 2%, or less than about 1%, or less than about 0.5%, or less than about 0.1%, or less than about 0.05%, impurities (e.g., aromatic compounds).

In some embodiments, the solvent is a long chain alpha-olefin solvent or comprises a mixture of long chain alpha-olefin solvents. Alpha-olefins (or α-olefins) are a family of organic compounds which are alkenes (also known as olefins) with a chemical formula CxH2x, distinguished by having a double bond at the primary or alpha (α) position. In some embodiments, x is 12-22, or 12-20, or 12-18, or 14-24, or 14-22, or 14-20, or 13-23, or 11-14. In some embodiments, the first type of solvent is a $C_{12}$-$C_{18}$ alpha-olefin solvent or comprises more than one type of $C_{12}$-$C_{18}$ alpha-olefin solvents. Non-limiting examples of $C_{12}$-$C_{18}$ alpha-olefin solvents include 1-dodecene, 2-methyl-1-undecene, 1-tridecene, 2-methyl-1-dodecene, 1-tetradecene, 2-methyl-1-tridecene, 1-pentadecene, 2-methyl-1-tetradecene, 1-hexadecene, 2-methyl-1-pentadecene, 1-heptadecene, 2-methyl-1-hexadecene, 1-octadecene, and 2-methyl-1-heptadecene.

In some embodiments, the first type of solvent (e.g., long chain hydrocarbon solvent) is present in an amount from about 1 wt % to about 25 wt %, or about 1 wt % to about 20 wt %, or from about 1 wt % to about 15 wt %, or from about 1 wt % to about 10 wt %, or from about 1 wt % and about 5 wt %, or from about 1 wt % and about 3 wt %, versus the total microemulsion.

In some embodiments, the solvent comprises an oxygenated solvent. As used herein, the term oxygenated solvent is given its ordinary meaning in the art and refers to solvents comprising one or more oxygen atoms in their molecular structure in addition to carbon atoms and hydrogen (e.g., an oxygenated hydrocarbon solvent). For example, the solvent may comprise one or more of an alcohol, an aldehyde, a ketone, an ester, or an ether. In some embodiments, the oxygenated solvent comprises a plurality of types of oxygenated solvents having 6-22 carbon atoms, or 6-18 carbon atoms, or 8-18 carbon atoms, or 12-18 carbon atoms. Non-limiting examples of oxygenated solvents include oxygenated terpenes, alcohols, ketones, aldehydes, and esters.

In some embodiments, the ketone is a ketone having 12-18 carbon atoms. In some embodiments, the aldehyde is an aldehyde having 12-18 carbon atoms. In some embodiments, the ester is an ester having 6-22 carbon atoms. In some embodiments, the ester is a methyl ester having 6-22 carbon atoms. In some embodiments, the ester is an alkyl aliphatic carboxylic acid ester.

In some embodiments, the solvent is an alcohol. For example, the alcohol may be a cyclic or acyclic, branched or unbranched alkane having 6 to 12 carbon atoms and substituted with a hydroxyl group (e.g., an alcohol). Non-limiting examples of cyclic or acyclic, branched or unbranched alkanes having 6 to 12 carbon atoms and substituted with a hydroxyl group include isomers of heptanol, isomers of octanol, isomers of nonanol, isomers of decanol, isomers of undecanol, isomers of dodecanol, and combinations thereof.

Non-limiting examples of alcohols include isomers of octanol (e.g., 1-octanol, 2-octanol, 3-octanol, 4-octanol), isomers of methyl heptanol, isomers of ethylhexanol (e.g., 2-ethyl-1-hexanol, 3-ethyl-1-hexanol, 4-ethyl-1-hexanol), isomers of dimethylhexanol, isomers of propylpentanol, isomers of methylethylpentanol, isomers of trimethylpentanol, and combinations thereof. In a particular embodiment, the cyclic or acyclic, branched or unbranched alkane has 8 carbon atoms and is substituted with a hydroxyl group. In a particular embodiment, the oxygenated solvent is isooctanol.

Non-limiting examples of oxygenated terpenes include terpenes containing alcohol, aldehyde, ether, or ketone groups. In some embodiments, the terpene comprises an ether-oxygen, for example, eucalyptol, or a carbonyl oxygen, for example, menthone. In some embodiments, the terpene is a terpene alcohol. Non-limiting examples of terpene alcohols include linalool, geraniol, nopol, α-terpineol, and menthol. Non-limiting examples of oxygenated terpenes include eucalyptol, 1,8-cineol, menthone, and carvone.

As used herein, "alkyl aliphatic carboxylic acid ester" refers to a compound or a blend of compounds having the general formula:

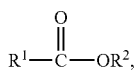

wherein $R^1$ is an optionally substituted aliphatic group, including those bearing heteroatom-containing substituent groups, and $R^2$ is a $C_1$ to $C_6$ alkyl group. In some embodiments, $R^1$ is $C_6$ to $C_{22}$ alkyl. In some embodiments, $R^1$ is substituted with at least one heteroatom-containing substituent group. For example, wherein a blend of compounds is provided and each $R^2$ is —$CH_3$ and each $R^1$ is independently a $C_6$ to $C_{22}$ aliphatic group, the blend of compounds is referred to as methyl aliphatic carboxylic acid esters, or methyl esters. In some embodiments, such alkyl aliphatic carboxylic acid esters may be derived from a fully synthetic process or from natural products, and thus comprise a blend of more than one ester. In some embodiments, the alkyl aliphatic carboxylic acid ester comprises butyl 3-hydroxybutyrate, isopropyl 3-hydroxybutyrate, hexyl 3-hydroxybutyrate, and combinations thereof. Non-limiting examples of alkyl aliphatic carboxylic acid esters include methyl octanoate, methyl decanoate, a blend of methyl octanoate and methyl decanoate, methyl octenoate, methyl decenoate, methyl dodecenoate, methyl tetradodecenoate, and butyl 3-hydroxybutyrate.

In some embodiments, the emulsion or the microemulsion may comprise a branched or unbranched dialkylether having the formula $C_nH_{2n+1}OC_mH_{2m+1}$ wherein n+m is from 6 to 16. In some embodiments, n+m is from 6 to 12, or from 6 to 10, or from 6 to 8. Non-limiting examples of branched or unbranched dialkylether compounds having the formula $C_nH_{2n+1}OC_mH_{2m+1}$ include isomers of $C_3H_7OC_3H_7$, isomers of $C_4H_9OC_3H_7$, isomers of $C_5H_{11}OC_3H_7$, isomers of $C_6H_{13}OC_3H_7$, isomers of $C_4H_9OC_4H_9$, isomers of $C_4H_9OC_5H_{11}$, isomers of $C_4H_9OC_6H_{13}$, isomers of $C_5H_{11}OC_6H_{13}$, and isomers of $C_6H_{13}OC_6H_{13}$. In a particular embodiment, the branched or unbranched dialkylether is an isomer of $C_6H_{13}OC_6H_{13}$ (e.g., dihexylether).

Other non-limiting examples of oxygenated solvents include 2-(acetoacetoxy)ethyl methacrylate, 2-(hydroxyethyl) methacrylate, 2,2-dimethyl-1,3-propanediol, 1,4-cyclohexanedimethanol, and oxoacids having 3-8 carbon atoms.

In some embodiments, the solvent is present in an amount from about 0.5 wt % to about 25 wt %, or from about 1 wt % to about 20 wt %, or from about 1 wt % to about 15 wt %, or from about 1 wt % to about 10 wt %, or from about 1 wt % and about 5 wt %, or from about 1 wt % and about 3 wt %, versus the total microemulsion.

In some embodiments, the emulsion of the microemulsion may comprise additional types of solvents. Non-limiting examples of such solvents include terpenes, terpineols, terpene alcohols, aldehydes, ketones, esters, amines, and amides.

Terpenes are generally derived biosynthetically from units of isoprene. Terpenes may be generally classified as monoterpenes (e.g., having two isoprene units), sesquiterpenes (e.g., having 3 isoprene units), diterpenes, or the like. The term "terpenoid" includes natural degradation products, such as ionones, and natural and synthetic derivatives, e.g., terpene alcohols, ethers, aldehydes, ketones, acids, esters, epoxides, and hydrogenation products (e.g., see Ullmann's Encyclopedia of Industrial Chemistry, 2012, pages 29-45, herein incorporated by reference). In some embodiments, the terpene is a naturally occurring terpene. In some embodiments, the terpene is a non-naturally occurring terpene and/or a chemically modified terpene (e.g., saturated terpene, terpene amine, fluorinated terpene, or silylated terpene). Terpenes that are modified chemically, such as by oxidation or rearrangement of the carbon skeleton, may be referred to as terpenoids. Many references use "terpene" and "terpenoid" interchangeably, and this disclosure will adhere to that usage.

In some embodiments, the terpene is a non-oxygenated terpene. In some embodiments, the terpene is citrus terpene. In some embodiments, the terpene is d-limonene. In some embodiments, the terpene is dipentene. In some embodiments, the terpene is selected from the group consisting of d-limonene, nopol, alpha terpineol, eucalyptol, dipentene, linalool, alpha-pinene, beta-pinene, alpha-terpinene, geraniol, alpha-terpinyl acetate, menthol, menthone, cineole, citranellol, and combinations thereof. As used herein, "terpene" refers to a single terpene compound or a blend of terpene compounds.

In some embodiments, an emulsion or microemulsion may comprise an unsubstituted cyclic or acyclic, branched or unbranched alkane. In some embodiments, the cyclic or acyclic, branched or unbranched alkane has from 6 to 12 carbon atoms. Non-limiting examples of unsubstituted, acyclic, unbranched alkanes include hexane, heptane, octane, nonane, decane, undecane, dodecane, and combinations thereof. Non-limiting examples of unsubstituted, acyclic, branched alkanes include isomers of methylpentane (e.g., 2-methylpentane, 3-methylpentane), isomers of dimethylbutane (e.g., 2,2-dimethylbutane, 2,3-dimethylbutane), isomers of methylhexane (e.g., 2-methylhexane, 3-methylhexane), isomers of ethylpentane (e.g., 3-ethylpentane), isomers of dimethylpentane (e.g., 2,2,-dimethylpentane, 2,3-dimethylpentane, 2,4-dimethylpentane, 3,3-dimethylpentane), isomers of trimethylbutane (e.g., 2,2,3-trimethylbutane), isomers of methylheptane (e.g., 2-methylheptane, 3-methylheptane, 4-methylheptane), isomers of dimethylhexane (e.g., 2,2-dimethylhexane, 2,3-dimethylhexane, 2,4-dimethylhexane, 2,5-dimethylhexane, 3,3-dimethylhexane, 3,4-dimethylhexane), isomers of ethylhexane (e.g., 3-ethylhexane), isomers of trimethylpentane (e.g., 2,2,3-trimethylpentane, 2,2,4-trimethylpentane, 2,3,3-trimethylpentane, 2,3,4-trimethylpentane), isomers of ethylmethylpentane (e.g., 3-ethyl-2-methylpentane, 3-ethyl-3-methylpentane), and combinations thereof. Non-limiting examples of unsubstituted cyclic branched or unbranched alkanes include cyclohexane, methylcyclopentane, ethylcyclobutane, propylcyclopropane, isopropylcyclopropane, dimethylcyclobutane, cycloheptane, methylcyclohexane, dimethylcyclopentane, ethylcyclopentane, trimethylcyclobutane, cyclooctane, methylcycloheptane, dimethylcyclohexane, ethylcyclohexane, cyclononane, methylcyclooctane, dimethylcycloheptane, ethylcycloheptane, trimethylcyclohexane, ethylmethylcyclohexane, propylcyclohexane, cyclodecane, and combinations thereof. In some embodiments, the unsubstituted cyclic or acyclic, branched or unbranched alkane having from 6 to 12 carbon atoms is selected from the group consisting of heptane, octane, nonane, decane, 2,2,4-trimethylpentane (isooctane), and propylcyclohexane, and combinations thereof.

In some embodiments, the emulsion or the microemulsion may comprise unsubstituted acyclic branched alkene or unsubstituted acyclic unbranched alkene having one or two double bonds and from 6 to 12 carbon atoms, or an unsubstituted acyclic branched alkene or unsubstituted acyclic unbranched alkene having one or two double bonds and from 6 to 10 carbon atoms. Non-limiting examples of unsubstituted acyclic unbranched alkenes having one or two double bonds and from 6 to 12 carbon atoms include isomers of hexene (e.g., 1-hexene, 2-hexene), isomers of hexadiene (e.g., 1,3-hexadiene, 1,4-hexadiene), isomers of heptene (e.g., 1-heptene, 2-heptene, 3-heptene), isomers of heptadiene (e.g., 1,5-heptadiene, 1-6, heptadiene), isomers of octene (e.g., 1-octene, 2-octene, 3-octene), isomers of octadiene (e.g., 1,7-octadiene), isomers of nonene, isomers of nonadiene, isomers of decene, isomers of decadiene, isomers of undecene, isomers of undecadiene, isomers of dodecene, isomers of dodecadiene, and combinations thereof. In some embodiments, the acyclic, unbranched alkene having one or two double bonds and from 6 to 12 carbon atoms is an alpha-olefin (e.g., 1-hexene, 1-heptene, 1-octene, 1-nonene, 1-decene, 1-undecene, 1-dodecene). Non-limiting examples of unsubstituted, acyclic, branched alkenes include isomers of methylpentene, isomers of dimethylpentene, isomers of ethylpentene, isomers of methylethylpentene, isomers of propylpentene, isomers of methylhexene, isomers of ethylhexene, isomers of dimethylhexene, isomers of methylethylhexene, isomers of methylheptene, isomers of ethylheptene, isomers of dimethylheptene, isomers of methylethylheptene, and combinations thereof.

In some embodiments, the emulsion or the microemulsion may comprise an aromatic solvent having a boiling point from about 300 to about 400 degrees Fahrenheit. Non-limiting examples of aromatic solvents having a boiling point from about 300 to about 400 degrees Fahrenheit include butylbenzene, hexylbenzene, mesitylene, light aromatic naphtha, heavy aromatic naphtha, and combinations thereof.

In some embodiments, the emulsion or the microemulsion may comprise an aromatic solvent having a boiling point from about 175 to about 300 degrees Fahrenheit. Non-limiting examples of aromatic liquid solvents having a boiling point from about 175 to about 300 degrees Fahrenheit include benzene, xylenes, and toluene.

In some embodiments, the emulsion or the microemulsion may comprise an amine of the formula $NR^1R^2R^3$, wherein $R^1$, $R^2$, and $R^3$ are the same or different and are $C_1$-$C_{16}$ alkyl groups that are (i) branched or unbranched; (ii) cyclic or acyclic; and (iii) substituted or unsubstituted. In some embodiments any two of $R^1$, $R^2$, and $R^3$ are joined together to form a ring. In some embodiments, each of $R^1$, $R^2$, and $R^3$ are the same or different and are hydrogen or alkyl groups that are (i) branched or unbranched; (ii) cyclic or acyclic; and (iii) substituted or unsubstituted. In some embodiments, any two of $R^1$, $R^2$, and $R^3$ are joined together to form a ring, provided at least one of $R^1$, $R^2$, and $R^3$ is a methyl or an ethyl group. In some embodiments, $R^1$ is $C_1$-$C_6$ alkyl group that is (i) branched or unbranched; (ii) cyclic or acyclic; and (iii) substituted or unsubstituted and $R^2$ and $R^3$ are hydrogen or a $C_8$-$C_{16}$ alkyl group that is (i) branched or unbranched; (ii) cyclic or acyclic; and (iii) substituted or unsubstituted. In some embodiments, $R^2$ and $R^3$ may be joined together to form a ring. In some embodiments, $R^1$ is a methyl or an ethyl group and $R^2$ and $R^3$ are the same or different and are $C_8$-$C_{16}$ alkyl groups that are (i) branched or unbranched; (ii) cyclic or acyclic; and (iii) substituted or unsubstituted. In some embodiments $R^2$ and $R^3$ may be joined together to form a ring. In some embodiments, $R^1$ is a methyl group and $R^2$ and $R^3$ are the same or different and are hydrogen or $C_8$-$C_{16}$ alkyl groups that are (i) branched or unbranched; (ii) cyclic or acyclic; and (iii) substituted or unsubstituted. In some embodiments $R^2$ and $R^3$ may be joined together to form a ring. In some embodiments, $R^1$ and $R^2$ are the same or different and are hydrogen or $C_1$-$C_6$ alkyl groups that are (i) branched or unbranched; (ii) cyclic or acyclic; and (iii) substituted or unsubstituted and $R^3$ is a $C_8$-$C_{16}$ alkyl group that is (i) branched or unbranched; (ii) cyclic or acyclic; and (iii) substituted or unsubstituted. In some embodiments, $R^1$ and $R^2$ are the same or different and are a methyl or an ethyl group and $R^3$ is hydrogen or a $C_8$-$C_{16}$ alkyl group that is (i) branched or unbranched; (ii) cyclic or acyclic; and (iii) substituted or unsubstituted. In some embodiments, $R^1$ and $R^2$ are methyl groups and $R^3$ is hydrogen or a $C_8$-$C_{16}$ alkyl group that is (i) branched or unbranched; (ii) cyclic or acyclic; and (iii) substituted or unsubstituted.

In some embodiments, the amine is of the formula $NR^1R^2R^3$, wherein $R^1$ is methyl and $R^2$ and $R^3$ are $C_8$-$C_{16}$ alkyl groups that are (i) branched or unbranched; (ii) cyclic or acyclic; and (iii) substituted or unsubstituted. In some embodiments $R^2$ and $R^3$ are joined together to form a ring. Non-limiting examples of amines include isomers of N-methyl-octylamine, isomers of N-methyl-nonylamine, isomers of N-methyl-decylamine, isomers of N-methylundecylamine, isomers of N-methyldodecylamine, isomers of N-methyl teradecylamine, isomers of N-methyl-hexadecylamine, and combinations thereof. In some embodiments, the amine is N-methyl-decylamine, N-methyl-hexadecylamine, or a combination thereof.

In some embodiments, the amine is of the formula $NR^1R^2R^3$, wherein $R^1$ is a methyl group and $R^2$ and $R^3$ are the same or different and are $C_8$-$C_{16}$ alkyl groups that are (i) branched or unbranched; (ii) cyclic or acyclic; and (iii) substituted or unsubstituted. In some embodiments $R^2$ and $R^3$ are joined together to form a ring. Non-limiting examples of amines include isomers of N-methyl-N-octyloctylamine, isomers of N-methyl-N-nonylnonylamine, isomers of N-methyl-N-decyldecylamine, isomers of N-methyl-N-undecylundecylamine, isomers of N-methyl-N-dodecyldodecylamine, isomers of N-methyl-N-tetradecylteradecylamine, isomers of N-methyl-N-hexadecylhexadecylamine, isomers of N-methyl-N-octylnonylamine, isomers of N-methyl-N-octyldecylamine, isomers of N-methyl-N-octyldodecylamine, isomers of N-methyl-N-octylundecylamine, isomers of N-methyl-N-octyltetradecylamine, isomers of N-methyl-N-octylhexadecylamine, N-methyl-N-nonyldecylamine, isomers of N-methyl-N-nonyldodecylamine, isomers of N-methyl-N-nonyltetradecylamine, isomers of N-methyl-N-nonylhexadecylamine, isomers of N-methyl-N-decylundecylamine, isomers of N-methyl-N-decyldodecylamine, isomers of N-methyl-N-decyltetradecylamine, isomers of N-methyl-N-decylhexadecylamine, isomers of N-methyl-N-dodecylundecylamine, isomers of N-methyl-N-dodecyltetradecylamine, isomers of N-methyl-N-dodecylhexadecylamine, isomers of N-methyl-N-tetradecylhexadecylamine, and combinations thereof. In some embodiments, the amine is selected from the group consisting of N-methyl-N-octyloctylamine, isomers of N-methyl-N-nonylnonylamine, isomers of N-methyl N-decyldecylamine, isomers of N-methyl-N-undecylundecylamine, isomers of N-methyl-N-dodecyldodecylamine, isomers of N-methyl-N-tetradecylteradecylamine, and isomers of N-methyl-N-hexadecylhexadecylamine, and combinations thereof. In some embodiments, the amine is N-methyl-N-dodecyldodecylamine, one or more isomers of N-methyl-N-hexadecylhexadecylamine, or combinations thereof. In some embodiments, the amine is selected from the group consisting of isomers of N-methyl-N-octylnonylamine, isomers of N-methyl-N-octyldecylamine, isomers of N-methyl-N-octyldodecylamine, isomers of N-methyl-N-octylundecylamine, isomers of N-methyl-N-octyltetradecylamine, isomers of N-methyl-N-octylhexadecylamine, N-methyl-N-nonyldecylamine, isomers of N-methyl-N-nonyldodecylamine, isomers of N-methyl-N-nonyltetradecylamine, isomers of N-methyl-N-nonylhexadecylamine, isomers of N-methyl-N-decyldodecylamine, isomers of N-methyl-N-decylundecylamine, isomers of N-methyl-N-decyldodecylamine, isomers of N-methyl-N-decyltetradecylamine, isomers of N-methyl-N-decylhexadecylamine, isomers of N-methyl-N-dodecylundecylamine, isomers of N-methyl-N-dodecyltetradecylamine, isomers of N-methyl-N-dodecylhexadecylamine, isomers of N-methyl-N-tetradecylhexadecylamine, and combinations thereof. In some embodiments, the cyclic or acyclic, branched or unbranched tri-substituted amine is selected from the group consisting of N-methyl-N-octyldodecylamine, N-methyl-N-octylhexadecylamine, and N-methyl-N-dodecylhexadecylamine, and combinations thereof.

In some embodiments, the amine is of the formula $NR^1R^2R^3$, wherein $R^1$ and $R^2$ are methyl and $R^3$ is a $C_8$-$C_{16}$ alkyl that is (i) branched or unbranched; (ii) cyclic or acyclic; and (iii) substituted or unsubstituted. Non-limiting examples of amines include isomers of N,N-dimethylnonylamine, isomers of N,N-dimethyldecylamine, isomers of N,N-dimethylundecylamine, isomers of N,N-dimethyldodecylamine, isomers of N,N-dimethyltetradecylamine, and isomers of N,N-dimethylhexadecylamine. In some embodiments, the amine is selected from the group consisting of N,N-dimethyldecylamine, isomers of N,N-dodecylamine, and isomers of N,N-dimethylhexadecylamine.

In some embodiments, the emulsion or the microemulsion may comprise an amide solvent. In some embodiments, the amide is of the formula $N(C=OR^4)R^5R^6$, wherein $R^4$, $R^5$, and $R^6$ are the same or different and are hydrogen or C4-16 alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, each of $R^4$, $R^5$, and $R^6$ are the same or different and are hydrogen or $C_4$-$C_{16}$ alkyl groups wherein the alkyl groups are (i) branched or unbranched; (ii) cyclic or acyclic; and (iii) substituted or unsubstituted, provided at least one of $R^4$, $R^5$, and $R^6$ is a methyl or an ethyl group. In some embodiments $R^5$ and $R^6$ are joined together to form a ring. In some embodiments, $R^4$ is hydrogen, $C_1$-$C_6$ alkyl, wherein the alkyl group is (i) branched or unbranched; (ii) cyclic or acyclic; and (iii) substituted or unsubstituted, and $R^5$ and $R^6$ are the same or different and are hydrogen or $C_8$-$C_{16}$ alkyl groups wherein the alkyl groups are (i) branched or unbranched; (ii) cyclic or acyclic; and (iii) substituted or unsubstituted. In some embodiments, $R^5$ and $R^6$ are joined together to form a ring. In some embodiments, $R^4$ is hydrogen, methyl, or ethyl and $R^5$ and $R^6$ are $C_8$-$C_{16}$ alkyl groups wherein the alkyl groups are (i) branched or unbranched; (ii) cyclic or acyclic; and (iii) substituted or unsubstituted. In some embodiments, $R^5$ and $R^6$ are joined together to form a ring. In some embodiments, $R^4$ is hydrogen and $R^5$ and $R^6$ are the same or different and are $C_8$-$C_{16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, $R^4$ and $R^5$ are the same or different and are hydrogen or $C_1$-$C_6$ alkyl groups wherein the alkyl groups are (i) branched or unbranched; (ii) cyclic or acyclic; and (iii) substituted or unsubstituted and $R^6$ is a $C_8$-$C_{16}$ alkyl group that is (i) branched or unbranched; (ii) cyclic or acyclic; and (iii) substituted or unsubstituted. In some embodiments, $R^4$ and $R^5$ are the same or different and are independently hydrogen, methyl, or ethyl and $R^6$ is a $C_8$-$C_{16}$ alkyl group that is (i) branched or unbranched; (ii) cyclic or acyclic; and (iii) substituted or unsubstituted. In some embodiments, $R^4$ and $R^5$ are hydrogen and $R^6$ is a $C_8$-$C_{16}$ alkyl group that is (i) branched or unbranched; (ii) cyclic or acyclic; and (iii) substituted or unsubstituted. In some embodiments, $R^6$ is hydrogen or $R^6$ is a $C_1$-$C_6$ alkyl group that is (i) branched or unbranched; (ii) cyclic or acyclic; and (iii) substituted or unsubstituted and $R^4$ and $R^5$ are the same or different and are $C_8$-$C_{16}$ alkyl groups wherein the alkyl groups are (i) branched or unbranched; (ii) cyclic or acyclic; and (iii) substituted or unsubstituted. In some embodiments, $R^6$ is hydrogen, methyl, or ethyl and $R^4$ and $R^5$ are the same or different and are $C_8$-$C_{16}$ alkyl groups wherein the alkyl groups are (i) branched or unbranched; (ii) cyclic or acyclic; and (iii) substituted or unsubstituted. In some embodiments, $R^6$ is hydrogen and $R^4$ and $R^5$ are the same or different and are $C_8$-$C_{16}$ alkyl groups wherein the alkyl groups are (i) branched or unbranched; (ii) cyclic or acyclic; and (iii) substituted or unsubstituted.

In some embodiments, the amide is of the formula $N(C=OR^4)R^5R^6$, wherein each of $R^4$, $R^5$, and $R^6$ are the same or different and are $C_4$-$C_{16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, the amide is of the formula $N(C=OR4)R^5R^6$, wherein each of $R^4$, $R^5$, and $R^6$ are the same or different and are $C_8$-$C_{16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. Non-limiting examples of amides include N,N-dioctyloctamide, N,N-dinonylnonamide, N,N-didecyldecamide, N,N-didodecyldodecamide, N,N-diundecylundecamide, N,N-ditetradecyltetradecamide, N,N-dihexadecylhexadecamide, N,N-didecyloctamide, N,N-didodecyloctamide, N,N-dioctyldodecamide, N,N-didecyldodecamide, N,N-dioctylhexadecamide, N,N-didecylhexadecamide, N,N-didodecylhexadecamide, and combinations thereof. In some embodiments, the amide is N,N-dioctyldodecamide, N,N-didodecyloctamide, or a combination thereof.

In some embodiments, the amide is of the formula $N(C=OR^4)R^5R^6$, wherein $R^6$ is selected from the group consisting of hydrogen, methyl, ethyl, propyl and isopropyl, and $R^4$ and $R^5$ are the same or different and are $C_4$-$C_{16}$ alkyl groups wherein the alkyl groups are (i) branched or unbranched; (ii) cyclic or acyclic; and (iii) substituted or unsubstituted. In some embodiments, $R^6$ is selected from the group consisting of hydrogen, methyl, ethyl, propyl and isopropyl, and $R^4$ and $R^5$ are the same or different and are $C_4$-$C_8$ alkyl groups wherein the alkyl groups are (i) branched or unbranched; (ii) cyclic or acyclic; and (iii) substituted or unsubstituted. In some embodiments, at least one of $R^4$ and $R^5$ is substituted with a hydroxyl group. In some embodiments, at least one of $R^4$ and $R^5$ is $C_1$-$C_{16}$ alkyl substituted with a hydroxyl group.

In some embodiments, the amide is of the formula $N(C=OR^4)R^5R^6$, wherein $R^6$ is $C_1$-$C_3$ alkyl and $R^4$ and $R^5$ are the same or different and are $C_4$-$C_{16}$ alkyl groups that are (i) branched or unbranched; (ii) cyclic or acyclic; and (iii) substituted or unsubstituted. In some embodiments, $R^6$ is selected from the group consisting of methyl, ethyl, propyl, and isopropyl, and $R^4$ and $R^5$ are the same or different and are $C_4$-$C_{16}$ alkyl groups that are (i) branched or unbranched; (ii) cyclic or acyclic; and (iii) substituted or unsubstituted. In some embodiments, $R^6$ is selected from the group consisting of methyl, ethyl, propyl, and isopropyl, and $R^4$ and $R^5$ are the same or different and are $C_8$-$C_{16}$ alkyl groups that are (i) branched or unbranched; (ii) cyclic or acyclic; and (iii) substituted or unsubstituted. In some embodiments, at least one of $R^4$ and $R^5$ is substituted with a hydroxyl group. In some embodiments, $R^6$ is selected from the group consisting of methyl, ethyl, propyl, and isopropyl, and $R^4$ and $R^5$ are the same or different and are $C_4$-$C_{16}$ alkyl groups that are (i) branched or unbranched; (ii) cyclic or acyclic; and (iii) substituted or unsubstituted. In some embodiments at least one of $R^4$ and $R^5$ is $C_1$-$C_{16}$ alkyl substituted with a hydroxyl group.

Non-limiting examples of amides include N,N-di-tert-butylformamide, N,N-dipentylformamide, N,N-dihexylformamide, N,N-diheptylformamide, N,N-dioctylformamide, N,N-dinonylformamide, N,N-didecylformamide, N,N-diundecylformamide, N,N-didodecylformamide, N,N-dihydroxymethylformamide, N,N-di-tert-butylacetamide, N,N-dipentylacetamide, N,N-dihexylacetamide, N,N-diheptylacetamide, N,N-dioctylacetamide, N,N-dinonylacetamide, N,N-didecylacetamide, N,N-diundecylacetamide, N,N-didodecylacetamide, N,N-dihydroxymethylacetamide, N,N-dimethylpropionamide, N,N-diethylpropionamide, N,N-dipropylpropionamide, N,N-di-n-propylpropionamide N,N-diisopropylpropionamide, N,N-dibutylpropionamide, N,N-di-n-butylpropionamide, N,N-di-sec-butylpropionamide, N,N-diisobutylpropionamide or N,N-di-tert-butylpropionamide, N,N-dipentylpropionamide, N,N-dihexylpropionamide, N,N-diheptylpropionamide, N,N-dioctylpropionamide, N,N-dinonylpropionamide, N,N-didecylpropionamide, N,N-diundecylpropionamide, N,N-didodecylpropionamide, N,N-dimethyl-n-butyramide, N,N-diethyl-n-butyramide, N,N-dipropyl-n-butyramide, N,N-di-n-propyl-n-butyramide or N,N-diisopropyl-n-butyramide, N,N-dibutyl-n-butyramide, N,N-di-n-butyl-n-butyramide, N,N-di-sec-butyl-n-butyramide, N,N-diisobutyl-n-butyramide, N,N-di-tert-butyl-n-butyramide, N,N-dipentyl-n-butyramide, N,N-dihexyl-n-butyramide, N,N-diheptyl-n-butyramide, N,N-dioctyl-n-butyramide, N,N-dinonyl-n-butyramide, N,N-didecyl-n-butyramide, N,N-diundecyl-n-butyramide, N,N-didodecyl-n-butyramide, N,N-dipentylisobutyramide, N,N-dihexylisobutyramide, N,N-diheptylisobutyramide, N,N-dioctylisobutyramide, N,N-dinonylisobutyramide, N,N-didecylisobutyramide, N,N-diundecylisobutyramide, N,N-didodecylisobutyramide, N,N-pentylhexylformamide, N,N-pentylhexylacetamide, N,N-pentylhexylpropionamide, N,N-pentylhexyl-n-butyramide, N,N-pentylhexylisobutyramide, N,N-methylethylpropionamide, N,N-methyl-n-propylpropionamide, N,N-methylisopropylpropionamide, N,N-methyl-n-butylpropionamide, N,N-methylethyl-n-butyramide, N,N-methyl-n-propyl-n-butyramide, N,N-methylisopropyl-n-butyramide, N,N-methyl-n-butyl-n-butyramide, N,N-methylethylisobutyramide, N,N-methyl-n-propylisobutyramide, N,N-methylisopropylisobutyramide, and N,N-methyl-n-butylisobutyramide. In some embodiments, the amide is selected from the group consisting of N,N-dioctyldodecacetamide, N,N-methyl-N-octylhexadecidodecylacetamide, N-methyl-N-hexadecyldodecylhexadecacetamide, and combinations thereof.

In some embodiments, the amide is of the formula $N(C=OR^4)R^5R^6$, wherein $R^6$ is hydrogen or a methyl group and $R^4$ and $R^5$ are $C_8$-$C_{16}$ alkyl groups that are (i) branched or unbranched; (ii) cyclic or acyclic; and (iii) substituted or unsubstituted. Non-limiting amides include isomers of N-methyloctamide, isomers of N-methylnonamide, isomers of N-methyldecamide, isomers of N-methylundecamide, isomers of N methyldodecamide, isomers of N methylteradecamide, and isomers of N-methyl-hexadecamide. In some embodiments, the amides are selected from the group consisting of N-methyloctamide, N-methyldodecamide, N-methylhexadecamide, and combinations thereof.

Non-limiting amides include isomers of N-methyl-N-octyloctamide, isomers of N-methyl-N-nonylnonamide, isomers of N-methyl-N-decyldecamide, isomers of N methyl-N undecylundecamide, isomers of N methyl-N-dodecyldodecamide, isomers of N methyl N-tetradecylteradecamide, isomers of N-methyl-N-hexadecylhdexadecamide, isomers of N-methyl-N-octylnonamide, isomers of N-methyl-N-octyldecamide, isomers of N-methyl-N-octyldodecamide, isomers of N-methyl-N-octylundecamide, isomers of N-methyl-N-octyltetradecamide, isomers of N-methyl-N-octylhexadecamide, N-methyl-N-nonyldecamide, isomers of N-methyl-N-nonyldodecamide, isomers of N-methyl-N-nonyltetradecamide, isomers of N-methyl-N-nonylhexadecamide, isomers of N-methyl-N-decyldodecamide, isomers of N methyl-N-decylundecamide, isomers of N-methyl-N-decyldodecamide, isomers of N-methyl-N-decyltetradecamide, isomers of N-methyl-N-decylhexadecamide, isomers of N methyl-N-dodecylundecamide, isomers of N methyl-N-dodecyltetradecamide, isomers of N-methyl-N-dodecylhexadecamide, isomers of N methyl-N-tetradecylhexadecamide, and combinations thereof. In some embodiments, the amide is selected from the group consisting of isomers of N-methyl-N-octyloctamide, isomers of N-methyl-N-nonylnonamide, isomers of N-methyl-N-decyldecamide, isomers of N methyl-N undecylundecamide, isomers of N methyl-N-dodecyldodecamide, isomers of N methyl N-tetradecylteradecamide, isomers of N-methyl-N-hexadecylhdexadecamide, and combinations thereof. In some embodiments, amide is selected from the group consisting of N-methyl-N-octyloctamide, N methyl-N-dodecyldodecamide, and N-methyl-N-hexadecylhexadecamide. In some embodiments, the amide is selected from the group consisting of isomers of N-methyl-N-octylnonamide, isomers of N-methyl-N-octyldecamide, isomers of N-methyl-N-octyldodecamide, isomers of N-methyl-N-octylundecamide, isomers of N-methyl-N-octyltetradecamide, isomers of N-methyl-N-octylhexadecamide, N-methyl-N-nonyldecamide, isomers of N-methyl-N-nonyldodecamide, isomers of N-methyl-N-nonyltetradecamide, isomers of N-methyl-N-nonylhexadecamide, isomers of N-methyl-N-decyldecamide, isomers of N methyl-N-decylundecamide, isomers of N-methyl-N-decyldodecamide, isomers of N-methyl-N-decyltetradecamide, isomers of N-methyl-N-decylhexadecamide, isomers of N methyl-N-dodecylundecamide, isomers of N methyl-N-dodecyltetradecamide, isomers of N-methyl-N-dodecylhexadecamide, and isomers of N methyl-N-tetradecylhexadecamide. In some embodiments, the amide is selected from the group consisting of N-methyl-N-octyldodecamide, N-methyl-N-octylhexadecamide, and N-methyl-N-dodecylhexadecamide.

In some embodiments, the amide is of the formula $N(C=OR^4)R^5R^6$, wherein $R^5$ and $R^6$ are the same or different and are hydrogen or $C_1$-$C_3$ alkyl groups and $R^4$ is a $C_4$-$C_{16}$ alkyl group that is (i) branched or unbranched; (ii) cyclic or acyclic; and (iii) substituted or unsubstituted. In some embodiments, $R^5$ and $R^6$ are the same or different and are selected from the group consisting of hydrogen, methyl, ethyl, propyl and isopropyl, and $R^4$ is a $C_4$-$C_{16}$ alkyl group that is (i) branched or unbranched; (ii) cyclic or acyclic; and (iii) substituted or unsubstituted. In some embodiments, $R^5$ and $R^6$ are the same or different and are selected from the group consisting of hydrogen, methyl, ethyl, propyl and isopropyl and $R^4$ is a $C_8$-$C_{16}$ alkyl group that is (i) branched or unbranched; (ii) cyclic or acyclic; and (iii) substituted or unsubstituted. In some embodiments, $R^4$ is substituted with a hydroxyl group. In some embodiments, $R^5$ and $R^6$ are the same or different and are selected from the group consisting of hydrogen, methyl, ethyl, propyl, and isopropyl, and $R^4$ is selected from the group consisting of tert-butyl and $C_5$-$C_{16}$ alkyl groups that are (i) branched or unbranched; (ii) cyclic or acyclic; and (iii) substituted or unsubstituted, and $C_1$-$C_{16}$ alkyl groups that are (i) branched or unbranched; (ii) cyclic or acyclic; and (iii) substituted with a hydroxyl group.

In some embodiments, the amide is of the formula $N(C=OR^4)R^5R^6$, wherein $R^5$ and $R^6$ are methyl groups and $R^4$ is a $C_8$-$C_{16}$ alkyl group that is (i) branched or unbranched; (ii) cyclic or acyclic; and (iii) substituted or unsubstituted. Non-limiting examples of amides include isomers of N,N-dimethyloctamide, isomers of N,N-dimethylnonamide, isomers of N,N-dimethyldecamide, isomers of N,N-dimethylundecamide, isomers of N,N-dimethyldodecamide, isomers of N,N-dimethyltetradecamide, isomers of N,N-dimethylhexadecamide, and combinations thereof. In some embodiments, the cyclic or acyclic, branched or unbranched trisubstituted amines is selected from the group consisting of N,N-dimethyloctamide, N,N-dodecamide, and N,N-dimethylhexadecamide.

In some embodiments, a solvent (e.g., a terpene) may be extracted from a natural source (e.g., citrus, pine), and may comprise one or more impurities present from the extraction process. In some embodiments, the solvent comprises a crude cut (e.g., uncut crude oil, e.g., made by settling, separation, heating, etc.). In some embodiments, the solvent is a crude oil (e.g., naturally occurring crude oil, uncut crude oil, crude oil extracted from the wellbore, synthetic crude oil, crude citrus oil, crude pine oil, eucalyptus, etc.). In some embodiments, the solvent comprises a citrus extract (e.g., crude orange oil, orange oil, etc.). In some embodiments, the solvent is a citrus extract (e.g., crude orange oil, orange oil, etc.).

Preferred solvents include organic solvents and more particularly, citrus terpenes. D-limonene provides a suitable and desirable solvent that is normally immiscible in water.

Co-Solvents

In some embodiments, the emulsion or the microemulsion may further comprise at least one co-solvent. The co-solvent may serve as a coupling agent between the one or more types of solvent and the surfactant and/or may aid in the stabilization of the emulsion or the microemulsion. In some embodiments, the co-solvent is an alcohol. The alcohol may also be a freezing point depression agent for the emulsion or the microemulsion. That is, the alcohol may lower the freezing point of the emulsion or the microemulsion.

The co-solvent component of the microemulsion additive may include a short-chain alcohol having a linear or branched chain with less than about 6 carbon atoms. In some embodiments, the alcohol is selected from primary, secondary, and tertiary alcohols. The co-solvent component may further include glycols and mutual solvents or mixtures of thereof. Unlimited examples of suitable alcohols and glycols include methanol, ethanol, 1-propanol, 2-propanol, isomeric butanols, ethylene glycol, triethlyne glycol, propylene glycol, and ethylene glycol monobutyl ether.

In some embodiments, the emulsion or the microemulsion comprises a first type of co-solvent and second type of co-solvent. In some embodiments, the first type of co-solvent is a small chain alcohol (e.g., $C_1$-$C_6$ alcohol such as isopropanol). In some embodiments, the second type of co-solvent is an small chain alkylene glycol (e.g., $C_1$-$C_7$ alkylene glycol such as propylene glycol).

In some embodiments, the emulsion or the microemulsion comprises from about 1 wt % to about 50 wt %, or from about 1 wt % to about 40 wt %, or from about 1 wt % to about 35 wt %, or from about 5 wt % to about 40 wt %, or from about 5 wt % to about 35 wt %, or from about 10 wt % to about 30 wt % of the co-solvent (e.g., alcohol), versus the total weight of the emulsion or the microemulsion composition.

In some embodiments, the emulsion or the microemulsion comprises from about 1 wt % and about 5 wt %, or from about 1 wt % and about 3 wt %, or about 2 wt % of the first type of co-solvent (e.g., $C_1$-$C_6$ alcohol such as isopropanol) and from about 15 wt % and about 25 wt %, or from about 17 wt % and about 22 wt % of the second type of co-solvent (e.g., $C_1$-$C_7$ alkylene glycol such as propylene glycol), versus the total weight of the emulsion or the microemulsion composition.

Particularly preferred embodiments contain from about 5% to about 40% by weight water, from about 0.05% to about 20% by weight solvent and from about 30% to about 75% by weight of nonionic surfactant mixture, in which a first surfactant is a surfactant with a hydrophile-lipophile balance (HLB) greater than about 7, and a second surfactant is an ethoxylated-propoxylated alkylene or alkyl amine with more than one nitrogen atom. In a more particularly preferred embodiment, the amine surfactant component is present in a weight ratio to other surfactants from about 0.01 to about 5 and comprises less than 50% of the total additive formulation.

Additives of the preferred embodiments may also contain from about 10% to about 30% by weight of co-solvents. Additives prepared in accordance with preferred embodiments present a colloidal system with droplets having the mean diameter of less than 200 nm when diluted with an aqueous carrier fluid in a ratio from about 1:10000 to about 1:10. In a particularly preferred embodiment, the solvent to water weight ratio is less than about 2.

The preferred embodiments of the microemulsion additives can be prepared by mixing individual components or in-situ by diluting solvent-surfactant blends with a selected carrier fluid, fracturing fluid or acidizing fluid in a batch-tank or on-the-fly during the treatment operation.

Additives

In some embodiments, the emulsion or the microemulsion may comprise one or more additives in addition to the components discussed above. In some embodiments, the one or more additional additives are present in an amount from about 0 wt % to about 70 wt %, or from about 1 wt % to about 40 wt %, or from about 0 wt % to about 30 wt %, or from about 0.5 wt % to about 30 wt %, or from about 1 wt % to about 30 wt %, or from about 0 wt % to about 25 wt %, or from about 1 wt % to about 25 wt %, or from about 0 wt % to about 20 wt %, or from about 1 wt % to about 20 wt %, or from about 3 wt % to about 20 wt %, or from about 8 wt % to about 16 wt %, versus the total weight of the emulsion or the microemulsion composition.

Non-limiting examples of additives include a demulsifier, a freezing point depression agent, a proppant, a scale inhibitor, a friction reducer, a biocide, a corrosion inhibitor, a buffer, a viscosifier, an oxygen scavenger, a clay control additive, a paraffin control additive, an asphaltene control additive, an acid, an acid precursor, or a salt.

In some embodiments, the additive is a demulsifier. The demulsifier may aid in preventing the formulation of an emulsion between a treatment fluid and crude oil. Non-limiting examples of demulsifiers include polyoxyethylene (50) sorbitol hexaoleate. In some embodiments, the demulsifier is present in microemulsion in an amount from about 4 wt % to about 8 wt % versus the total weight of the emulsion or the microemulsion composition.

In some embodiments, the emulsion or the microemulsion comprises a freezing point depression agent (e.g., propylene glycol). The emulsion or the microemulsion may comprise a single freezing point depression agent or a combination of two or more freezing point depression agents. The term "freezing point depression agent" is given its ordinary meaning in the art and refers to a compound which is added to a solution to reduce the freezing point of the solution. That is, in some embodiments, a solution comprising the freezing point depression agent has a lower freezing point as compared to an essentially identical solution not comprising the freezing point depression agent. Those of ordinary skill in the art will be aware of suitable freezing point depression agents for use in the emulsion or the microemulsions described herein. Non-limiting examples of freezing point depression agents include primary, secondary, and tertiary alcohols with from 1 to 20 carbon atoms and alkylene glycols. In some embodiments, the alcohol comprises at least 2 carbon atoms. Non-limiting examples of alcohols include methanol, ethanol, i-propanol, n-propanol, t-butanol, n-butanol, n-pentanol, n-hexanol, and 2-ethyl hexanol. In some embodiments, the freezing point depression agent is not methanol (e.g., due to toxicity). Non-limiting examples of alkylene glycols include ethylene glycol (EG), polyethylene glycol (PEG), propylene glycol (PG), and triethylene glycol (TEG). In some embodiments, the freezing point depression agent is not ethylene oxide (e.g., due to toxicity). In some embodiments, the freezing point depression agent comprises an alcohol and an alkylene glycol. In some embodiments, the freezing point depression agent comprises a carboxycyclic acid salt and/or a di-carboxycylic acid salt. Another non-limiting example of a freezing point depression agent is a combination of choline chloride and urea. In some embodiments, the emulsion or the microemulsion comprising the freezing point depression agent is stable over a wide range of temperatures, e.g., from about 50° F. to 200° F. In some embodiments a freezing point depression agent is present in the emulsion or the microemulsion in an amount from about 10 wt % to about 15 wt %.

In some embodiments, the emulsion or the microemulsion comprises a proppant. In some embodiments, the proppant acts to hold induced hydraulic fractures open in an oil and/or gas well. Non-limiting examples of proppants (e.g., propping agents) include grains of sand, glass beads, crystalline silica (e.g., quartz), hexamethylenetetramine, ceramic proppants (e.g., calcined clays), resin coated sands, and resin coated ceramic proppants. Other proppants are also possible and will be known to those skilled in the art.

In some embodiments, the emulsion or the microemulsion comprises a scale inhibitor. The scale inhibitor may slow down scaling in, e.g., the treatment of an oil and/or gas well, wherein scaling involves the unwanted deposition of solids (e.g., along a pipeline) that hinders fluid flow. Non-limiting examples of scale inhibitors include one or more of methyl alcohol, organic phosphonic acid salts (e.g., phosphonate salt, aminopolycarboxlic acid salts), polyacrylate, ethane-1,2-diol, calcium chloride, and sodium hydroxide. Other scale inhibitors are also possible and will be known to those skilled in the art.

In some embodiments, the emulsion or the microemulsion comprises a friction reducer. The friction reducer may reduce drag, which reduces energy input required in the context of e.g. delivering the emulsion or the microemulsion into a wellbore. Non-limiting examples of friction reducers include oil-external emulsions of polymers with oil-based solvents and an emulsion-stabilizing surfactant. The emulsions may include natural-based polymers like guar, cellulose, xanthan, proteins, polypeptides or derivatives of same or synthetic polymers like polyacrylamide-co-acrylic acid (PAM-AA), polyethylene oxide, polyacrylic acid, and other copolymers of acrylamide and other vinyl monomers. For a list of non-limiting examples, see U.S. Pat. No. 8,865,632, filed Nov. 10, 2008, titled "DRAG-REDUCING COPOLYMER COMPOSITION," herein incorporated by reference. Other common drag-reducing additives include dispersions of natural- or synthetic polymers and copolymers in saline solution and dry natural- or synthetic polymers and copolymers. These polymers or copolymers may be nonionic, amphoteric, zwitterionic, anionic, or cationic depending on the composition of polymer and pH of solution. Other non-limiting examples of friction reducers include petroleum distillates, ammonium salts, polyethoxylated alcohol surfactants, and anionic polyacrylamide copolymers. Other friction reducers are also possible and will be known to those skilled in the art.

In some embodiments, the emulsion or the microemulsion comprises a biocide. The biocide may kill unwanted organisms (e.g., microorganisms) that come into contact with the emulsion or the microemulsion. Non-limiting examples of biocides include didecyl dimethyl ammonium chloride, gluteral, Dazomet, bronopol, tributyl tetradecyl phosphonium chloride, tetrakis (hydroxymethyl) phosphonium sulfate, AQUCAR®, UCARCIDE®, glutaraldehyde, sodium hypochlorite, and sodium hydroxide. Other biocides are also possible and will be known to those skilled in the art.

In some embodiments, the emulsion or the microemulsion comprises a corrosion inhibitor. The corrosion inhibitor may reduce corrosion during e.g. treatment of an oil and/or gas well (e.g., in a metal pipeline). Non-limiting examples of corrosion inhibitors include isopropanol, quaternary ammonium compounds, thiourea/formaldehyde copolymers, propargyl alcohol, and methanol. Other corrosion inhibitors are also possible and will be known to those skilled in the art.

In some embodiments, the emulsion or the emulsion or the microemulsion comprises a buffer. The buffer may maintain the pH and/or reduce changes in the pH of the aqueous phase of the emulsion or the microemulsion. Non-limiting examples of buffers include acetic acid, acetic anhydride, potassium hydroxide, sodium hydroxide, and sodium acetate. Other buffers are also possible and will be known to those skilled in the art.

In some embodiments, the emulsion or the microemulsion comprises a viscosifier. The viscosifier may increase the viscosity of the emulsion or the microemulsion. Non-limiting examples of viscosifiers include polymers, e.g., guar, cellulose, xanthan, proteins, polypeptides or derivatives of same or synthetic polymers like polyacrylamide-co-acrylic acid (PAM-AA), polyethylene oxide, polyacrylic acid, and other copolymers of acrylamide and other vinyl monomers. Other viscosifiers are also possible and will be known to those skilled in the art.

In some embodiments, the emulsion or the microemulsion comprises an oxygen scavenger. The oxygen scavenger may decrease the level of oxygen in the emulsion or the microemulsion. Non-limiting examples of oxygen scavengers include sulfites and bisulfites. Other oxygen scavengers are also possible and will be known to those skilled in the art.

In some embodiments, the emulsion or the microemulsion comprises a clay control additive. The clay control additive may minimize damaging effects of clay (e.g., swelling, migration), e.g., during treatment of oil and/or gas wells. Non-limiting examples of clay control additives include quaternary ammonium chloride, tetramethylammonium chloride, polymers (e.g., polyanionic cellulose (PAC), partially hydrolyzed polyacrylamide (PHPA), etc.), glycols, sulfonated asphalt, lignite, sodium silicate, and choline chloride. Other clay control additives are also possible and will be known to those skilled in the art.

In some embodiments, the emulsion or the microemulsion comprises a paraffin control additive and/or an asphaltene control additive. The paraffin control additive or the asphaltene control additive may minimize paraffin deposition or asphaltene precipitation respectively in crude oil, e.g., during treatment of oil and/or gas wells. Non-limiting examples of paraffin control additives and asphaltene control additives include active acidic copolymers, active alkylated polyester, active alkylated polyester amides, active alkylated polyester imides, aromatic naphthas, and active amine sulfonates. Other paraffin control additives and asphaltene control additives are also possible and will be known to those skilled in the art.

In some embodiments, the emulsion or the microemulsion comprises an acid and/or an acid precursor (e.g., an ester). For example, the emulsion or the microemulsion may comprise an acid when used during acidizing operations. In some embodiments, the surfactant is alkaline and an acid (e.g., hydrochloric acid) may be used to adjust the pH of the emulsion or the microemulsion towards neutral. Non-limiting examples of acids or di-acids include hydrochloric acid, acetic acid, formic acid, succinic acid, maleic acid, malic acid, lactic acid, and hydrochloric-hydrofluoric acids. In some embodiments, the emulsion or the microemulsion comprises an organic acid or organic di-acid in the ester (or di-ester) form, whereby the ester (or diester) is hydrolyzed in the wellbore and/or reservoir to form the parent organic acid and an alcohol in the wellbore and/or reservoir. Non-limiting examples of esters or di-esters include isomers of methyl formate, ethyl formate, ethylene glycol diformate, alpha,alpha-4-trimethyl-3-cyclohexene-1-methylformate, methyl lactate, ethyl lactate, alpha,alpha-4-trimethyl 3-cyclohexene-1-methyllactate, ethylene glycol dilactate, ethylene glycol diacetate, methyl acetate, ethyl acetate, alpha,alpha,-4-trimethyl-3-cyclohexene-1-methylacetate, dimethyl succinate, dimethyl maleate, di(alpha,alpha-4-trimethyl-3-cyclohexene-1-methyl)-succinate, 1-methyl-4-(1-methylethenyl)-cyclohexylformate, 1-methyl-4-(1-ethylethenyl)-cyclohexylactate, 1-methyl-4-(1-methylethenyl)-cyclohexylacetate, and di(1-methy-4-(1-methylethenyl) cyclohexyl)-succinate. Other acids are also possible and will be known to those skilled in the art.

In some embodiments, the emulsion or the microemulsion comprises a salt. The salt may reduce the amount of water needed as a carrier fluid and/or may lower the freezing point of the emulsion or the microemulsion. Non limiting examples of salts include salts comprising K, Na, Br, Cr, Cs, or Li, e.g., halides of these metals, including but not limited to NaCl, KCl, CaCl2, and MgCl2. Other salts are also possible and will be known to those skilled in the art.

In some embodiments, the emulsion or the microemulsion comprises an additive as described in U.S. patent application Ser. No. 15/457,792, filed Mar. 13, 2017, titled "METHODS AND COMPOSITIONS INCORPORATING ALKYL POLYGLYCOSIDE SURFACTANT FOR USE IN OIL AND/OR GAS WELLS," published as US 2017-0275518 on Sep. 28, 2017, herein incorporated by reference.

EXAMPLES

The following provides a description of laboratory investigations used to establish the efficacy of the inventive microemulsion additives. These experiments included an analysis of the effectiveness of the additives on oil-brine displacement and gas-brine displacement. The microemulsion additives of the preferred embodiments were compared against prior-art reference additives.

For the oil-brine displacement experiments, a 25 cm long, 2.5 cm diameter capped glass chromatography column was packed with 77 grams of 100 mesh sand. The column was left open on one end and a PTFE insert containing a recessed bottom, 3.2 mm diameter outlet, and nipple was placed into the other end. Prior to placing the insert into the column, a 3 cm diameter filter paper disc (Whatman®, #40) was pressed firmly into the recessed bottom of the insert to prevent leakage of 100 mesh sand. A 2" piece of vinyl tubing was placed onto the nipple of the insert and a clamp was fixed in place on the tubing prior to packing. The columns were gravity-packed by pouring approximately 25 grams of the brine (or brine with chemical treatment) into the column followed by a slow, continuous addition of sand.

After the last portion of sand had been added and was allowed to settle, the excess of brine was removed from the column so that the level of liquid exactly matched the level of the sand. Pore volume in the packed column was calculated as the difference in mass of fluid prior to column packing and after the column had been packed. Three additional pore volumes of brine were passed through the column. After the last pore volume was passed, the level of brine was adjusted exactly to the level of sand bed. Light condensate oil was then added on the top of sand bed to form the 5 cm oil column above the bed. Additional oil was placed into a separatory funnel with a side arm open to an atmosphere.

Once the setup was assembled, the clamp was released from the tubing, and timer was started. Throughout the experiment the level of oil was monitored and kept constant at a 5 cm mark above the bed. Oil was added from the separatory funnel as necessary, to ensure this constant level of head in the column. Portions of effluent coming from the column were collected into plastic beakers over a measured time intervals. The amount of fluid was monitored. When both brine and oil were produced from the column, they were separated with a syringe and weighed separately. The experiment was conducted for 3 hours at which the steady-state conditions were typically reached. The cumulative % or aqueous fluid displaced from the column over 120 minute (2 hour) time period was determined.

For the gas-brine displacement experiments, a 51 cm long, 2.5 cm in diameter capped glass chromatography column was filled with approximately 410±20 g of 20/40 mesh Ottawa sand and a brine (or brine containing chemical treatment). To ensure uniform packing, small amounts of proppant were interchanged with small volumes of liquid. Periodically the mixture in the column was homogenized with the help of an electrical hand massager, in order to remove possible air pockets. Sand and brine were added to completely fill the column to the level of the upper cap. The exact amounts of fluid and sand placed in the column were determined in each experiment. The column was oriented vertically and was connected at the bottom to a nitrogen cylinder via a gas flow controller pre-set at a flow rate of 60 cm³/min. The valve at the bottom was slowly opened and liquid exiting the column at the top was collected into a tarred jar placed on a balance. Mass of collected fluid was recorded as a function of time by a computer running a data logging software. The experiments were conducted until no more brine could be displaced from the column. The total % of fluid recovered was then calculated.

For these experiments, microemulsion additives were prepared in the laboratory by mixing the selected terpene solvent, water, conventional nonionic surfactant with HLB>7, and ethoxylated and propoxylated alkylene or alkyl amine surfactant in ratios described above. All of these constituent components are commercially available from a variety of sources. Typically, the components were mixed together in the order: water, alcohol, nonionic surfactant, ethoxylated-propoxylated alkylene or alkyl amine, and lastly citrus terpene solvent. Other orders of addition are also suitable. The mixtures were then agitated on a magnetic stirrer for 5-10 minutes.

The microemulsion additives were then diluted to use concentrations of 1 or 2.0 gallons per 1000 gallons with 2% KCl brine and these diluted fluids were used in gas-oil and gas-brine displacement experiments described above. The selected concentrations are those typically suitable, but other concentrations can be used by those skilled in the art. In addition to the compositions of the present invention, several compositions of the prior art were also prepared. Notably, these prior art reference compositions did not contain the ethoxylated-propoxylated alkylene or alkyl amine component. The reference additives are presented in Table 1 below:

TABLE 1

| Reference Additives | |
|---|---|
| Reference microemulsion #1 (ME #1) | |
| Deionized water: | 11.9 wt % |
| Ethoxylated alcohol nonionic surfactant package | 75.1 wt % |
| co-solvent | 8.0 wt % |
| Citrus terpene: | 5.0 wt % |
| Reference microemulsion #2 (ME #2) | |
| Deionized water: | 15 wt % |
| Ethoxylated alcohol nonionic surfactant package | 36.4 wt % |
| Co-solvent | 26.5 wt % |
| Citrus terpene: | 22.1 wt % |
| Reference microemulsion #3 (ME #3) | |
| Deionized water: | 22.5 wt % |
| co-solvent | 35.1 wt % |

TABLE 1-continued

| Reference Additives | |
|---|---|
| Pluronic ® surfactant | 13.5 wt % |
| Ethoxylated castor oil: | 13.5 wt % |
| Citrus terpene: | 15.4 wt % |

The microemulsion additives of the preferred embodiments were prepared according to the examples set forth in Table 2:

TABLE 2

| Inventive Microemulsion Additives | |
|---|---|
| Example 1 | |
| Deionized water | 16.2 wt % |
| Ethoxylated alcohol surfactant package | 56.1 wt % |
| 2-propanol co-solvent | 11.5 wt % |
| Citrus terpene | 4.5 wt % |
| Ethylenediaminealkoxylate | 11.7 wt % |
| Example 2 | |
| Deionized water | 16.2 wt % |
| Ethoxylated alcohol surfactant package | 56.1 wt % |
| co-solvent | 11.5 wt % |
| Citrus terpene | 4.5 wt % |
| Diethylenetriaminealkoxylate | 11.7 wt % |
| Example 3 | |
| Deionized water | 6.4 wt % |
| Ethoxylated alcohol surfactant package | 60.1 wt % |
| co-solvent | 11.5 wt |
| Citrus terpene | 7 wt % |
| Ethylenediaminealkoxylate | 15 wt % |
| Example 4 | |
| Deionized water | 0.4 wt % |
| Ethoxylated alcohol surfactant package | 66.1 wt % |
| 2-propanol co-solvent | 11.5 wt % |
| Citrus terpene | 7 wt % |
| Ethylenediaminealkoxylate | 15 wt % |

Each of the reference additives and inventive additives were evaluated using the test protocols set forth above. The results of these experiments are summarized in Table 3 below as a percentage of the recovery of brine displacement by gas and brine displacement by oil. Each reference additive and inventive additive was utilized in a concentration range of between 1 gpt and 2 gpt.

TABLE 3

| Sample | Effectiveness of brine displacement by gas | Effectiveness of brine displacement by oil |
|---|---|---|
| Reference ME# 1 1 gpt | 80% | 38% |
| Reference ME # 2 2 gpt | 80% | 43% |
| Reference ME # 3 1.5 gpt | 25% | 80% |
| Example 1 1 gpt | 75% | 88% |
| Example 2 1 gpt | 81% | 84% |
| Example 3 1 gpt | 59% | 88% |
| Example 4 1 gpt | 72% | 91% |

Based on the results summarized above, it is clear that Reference Additives Nos. 1 and 2 are well-suited for enhancing gas recovery but are not as effective for the recovery of liquid hydrocarbons. Reference Additive No. 3 performed well during the liquid recovery test but did not displace a significant percentage of hydrocarbons during the gas test. Thus, the reference formulations did not demonstrate an ability to recover both liquid and gaseous hydrocarbons effectively. In contrast, the inventive microemulsion additives demonstrated effective recovery of both liquid and gaseous hydrocarbons. The ability of these inventive formulations to enhance the recovery of both liquid and gaseous hydrocarbons represents a significant advancement over the prior art.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed and as defined in the written description. For example, surfactant and surfactant mixture selections can be modified and changed to take into account varying reservoir conditions.

What is claimed is:

1. A well treatment composition comprising:
   a first surfactant;
   a second surfactant, wherein the second surfactant comprises ethylenediaminealkoxylate;
   a first solvent;
   a second solvent, wherein the second solvent is a co-solvent; and
   water.

2. The well treatment composition of claim 1, wherein the first solvent is immiscible with water and suspended or solubilized by the first and second surfactants as an internal phase within an external aqueous phase.

3. The well treatment composition of claim 1, wherein the co-solvent is selected from the group consisting of short-chain alcohols and glycols.

4. The well treatment composition of claim 1, further comprising a carrier fluid.

5. The well treatment composition of claim 1, wherein the first solvent, second solvent, first surfactant and second surfactant are emulsified as an oil-internal emulsion where the first solvent is suspended or solubilized within the external water phase by the first and second surfactants.

6. The well treatment composition of claim 1, wherein the well treatment composition comprises:
   up to about 90% by volume of the first surfactant;
   up to about 16% by volume of the second surfactant;
   up to about 10% by volume of the first solvent, wherein the first solvent is d-limonene;
   up to about 25% by volume of the second solvent, wherein the second solvent comprises a co-solvent or a mixture of co-solvents; and
   up to about 30% by volume of the water.

7. The well treatment composition of claim 1, wherein the well treatment composition is an emulsion or microemulsion.

8. The well treatment composition of claim 1, wherein the first surfactant comprises ethoxylated tristyrylphenol.

9. The well treatment composition of claim 1, wherein the first solvent comprises d-limonene and/or the co-solvent comprises isopropanol.

10. The well treatment composition of claim 1, wherein the well treatment composition comprises 10 wt % to 30 wt % of the second solvent and 5 wt % to 30 wt % water.

11. The well treatment composition of claim 1, wherein:
    the well treatment composition is an emulsion or microemulsion;
    the first surfactant comprises ethoxylated tristyrylphenol;
    the first solvent comprises d-limonene; and
    the second solvent comprises isopropanol.

* * * * *